(12) United States Patent
Nakamoto

(10) Patent No.: US 10,680,219 B2
(45) Date of Patent: Jun. 9, 2020

(54) BATTERY PACK PRODUCTION METHOD

(71) Applicant: Envision AESC Japan Ltd., Zama-shi, Kanagawa (JP)

(72) Inventor: Masahiro Nakamoto, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 16/478,534

(22) PCT Filed: Feb. 8, 2018

(86) PCT No.: PCT/JP2018/004446
§ 371 (c)(1),
(2) Date: Jul. 17, 2019

(87) PCT Pub. No.: WO2018/163708
PCT Pub. Date: Sep. 13, 2018

(65) Prior Publication Data
US 2019/0348650 A1  Nov. 14, 2019

(30) Foreign Application Priority Data
Mar. 7, 2017 (JP) .................. 2017-043123

(51) Int. Cl.
*H01M 2/10* (2006.01)
*H01M 2/14* (2006.01)

(52) U.S. Cl.
CPC ......... *H01M 2/1077* (2013.01); *H01M 2/145* (2013.01); *H01M 2220/20* (2013.01)

(58) Field of Classification Search
None
See application file for complete search history.

(56) References Cited

U.S. PATENT DOCUMENTS

2005/0250005 A1  11/2005  Bacon et al.
2012/0219839 A1   8/2012  Kritzer et al.
(Continued)

FOREIGN PATENT DOCUMENTS

| EP | 2 728 643 A1 | 5/2014 |
| JP | 2009-26703 A | 2/2009 |
| JP | 2012-204356 A | 10/2012 |

(Continued)

*Primary Examiner* — Haroon S. Sheikh
(74) *Attorney, Agent, or Firm* — Global IP Counselors, LLP

(57) ABSTRACT

A battery pack production method is provided for producing a battery pack having several unit cells that are stacked with filling members interposed therebetween. The stacked unit cells are electrically connected. The battery pack production method includes measuring the thicknesses of the unit cells, arranging a filling member between adjacent ones the unit cells, and pressurizing the filling member to reduce a thickness of the filling member in the stacking-direction. In the battery pack production method, the thickness of the filling member is controlled based on the measured thicknesses of the unit cells after stacking according to at least one of: an amount of the elastic adhesives arranged; a length of time during which the elastic adhesives are pressurized; and a force pressurizing the elastic adhesives; and a distance between stacking-direction centers of two unit cells adjacent in the stacking direction is kept within a constant range.

11 Claims, 21 Drawing Sheets

S101 — MEASUREMENT STEP (MEASURING THICKNESS OF UNIT CELL 110)

S102 — STACKING STEP ✕ PRESSURIZATION STEP (STACKING UNIT CELLS 110, ETC.)

S103 — ARRANGEMENT STEP (ARRANGING ELASTIC ADHESIVE 117 ON UNIT CELL 110)

S104 — PRESSURIZATION STEP (PRESSURIZING UNIT CELLS 110)

S105 — ELECTRICAL PATHWAY CONNECTION STEP (ELECTRICALLY CONNECTING UNIT CELLS 110)

(56) References Cited

U.S. PATENT DOCUMENTS

2014/0101929 A1* 4/2014 Kim .................... H01M 2/1061
29/623.1
2016/0301045 A1  10/2016 Tyler et al.

FOREIGN PATENT DOCUMENTS

| JP | 2013-12464 A | 1/2013 |
| JP | 2014-110219 A | 6/2014 |
| JP | 2015-26424 A | 2/2015 |
| JP | 2015-53261 A | 3/2015 |
| JP | 2016-225131 A | 12/2016 |
| KR | 10-2010-0036373 A | 4/2010 |
| KR | 10-2011-0137740 A | 12/2011 |
| WO | 2017/068703 A1 | 4/2017 |

* cited by examiner

BATTERY PACK PRODUCTION METHOD

CROSS-REFERENCE TO RELATED APPLICATIONS

This application is a U.S. national stage application of International Application No. PCT/JP2018/004446, filed on Feb. 8, 2018. The present application is based on Japan Patent Application No. 2017-043123 filed on Mar. 7, 2017, and the contents disclosed therein are incorporated herein as a whole by reference.

BACKGROUND

Technical Field

The present invention relates to a method for producing a battery pack.

Background Information

Conventionally, there have been, for example, battery packs (equivalent to all-solid batteries) that are mounted in vehicles such as electric automobiles, and that can be used as power sources which drive vehicle motors. A plurality of unit cells (equivalent to battery units) are stacked to constitute a battery pack. Terminals of different unit cells are electrically connected to each other by busbars (equivalent to wiring, etc.) (see, Japanese Laid-Open Patent Application No. 2015-53261).

SUMMARY

To stack a plurality of unit cells and join the terminals of the respective unit cells and the corresponding busbars, mutual relative positions must be aligned. However, when unit cells having variation in thickness are used, there are cases in which intervals between the stacked unit cells are not constant and it is difficult to join the corresponding busbars. When there is variation in distances between centers of the unit cells along a stacking direction of the unit cells, there is also variation in a height of a final stack along the stacking direction; therefore, when, for example, the stack is to be accommodated in a case, it will sometimes no longer be possible to accommodate the stack in the case. Consequently, not only is it difficult to connect the busbars with electrodes of the unit cells, but various other problems occur as well.

An object of the present invention is to provide a method for producing a battery pack in which a height along a stacking direction of a stack of stacked unit cells can be kept within a constant range even when there is variation in thicknesses of the unit cells.

A method for producing a battery pack for achieving the object described above is a method for producing a battery pack in which a plurality of unit cells are stacked with a filling member interposed therebetween, and the stacked unit cells are electrically connected. The method for producing a battery pack has a measurement step of measuring the thicknesses of the unit cells, an arrangement step of arranging the viscous filling member between the unit cells adjacent in the stacking direction, and a pressurization step of applying pressurization, in the stacking direction via the unit cells, to the viscous filling member arranged between the unit cells, and reducing the stacking-direction thickness of the filling member. In the method for producing a battery pack, the stacking-direction thickness of the filling member is controlled based on the measured thicknesses of each of the unit cells adjacent after stacking, the control being performed according to at least one of the following: an amount of the filling member arranged in the arrangement step; a length of time during which the filling member is pressurized in the pressurization step; and a force pressurizing the filling member in the pressurization step; and a distance between stacking-direction centers of two unit cells adjacent in the stacking direction is kept within a constant range.

DETAILED DESCRIPTION OF THE EMBODIMENTS

Figure 1:
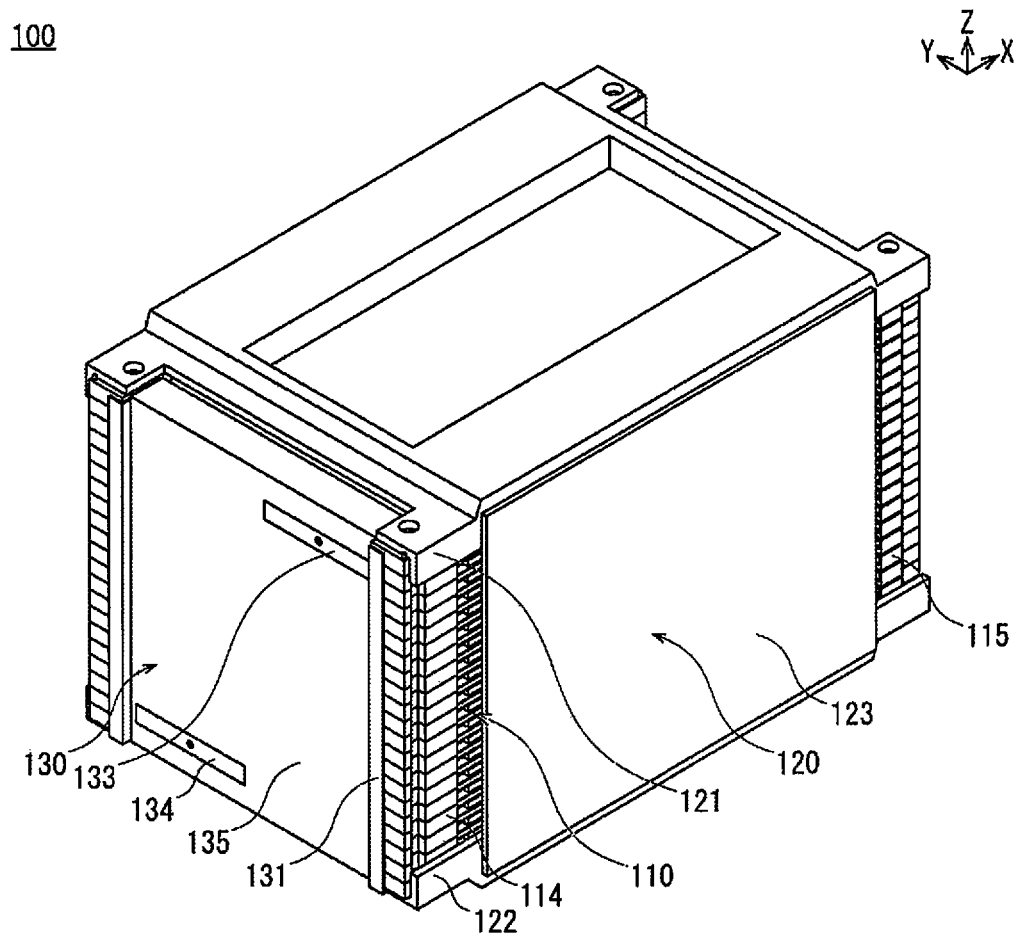
FIG. 1 is a perspective view showing a battery pack according to an embodiment.

First through third embodiments of the present invention and modifications thereof are described below with reference to the accompanying drawings. The same reference numerals are used for the same members in the drawings, and duplicate descriptions are omitted. The sizes and ratios of the members in the drawings are emphasized to make the first through third embodiments easier to understand, and may be different from actual sizes and ratios.

In the drawings, directions of a battery pack 100 are indicated using arrows represented by X, Y, and Z. The direction of the arrow represented by X is a long-axis direction of the battery pack 100. The direction of the arrow represented by Y is indicates a short-axis direction of the battery pack 100. The direction of the arrow represented by Z is the stacking direction of the battery pack 100.

Figure 11:
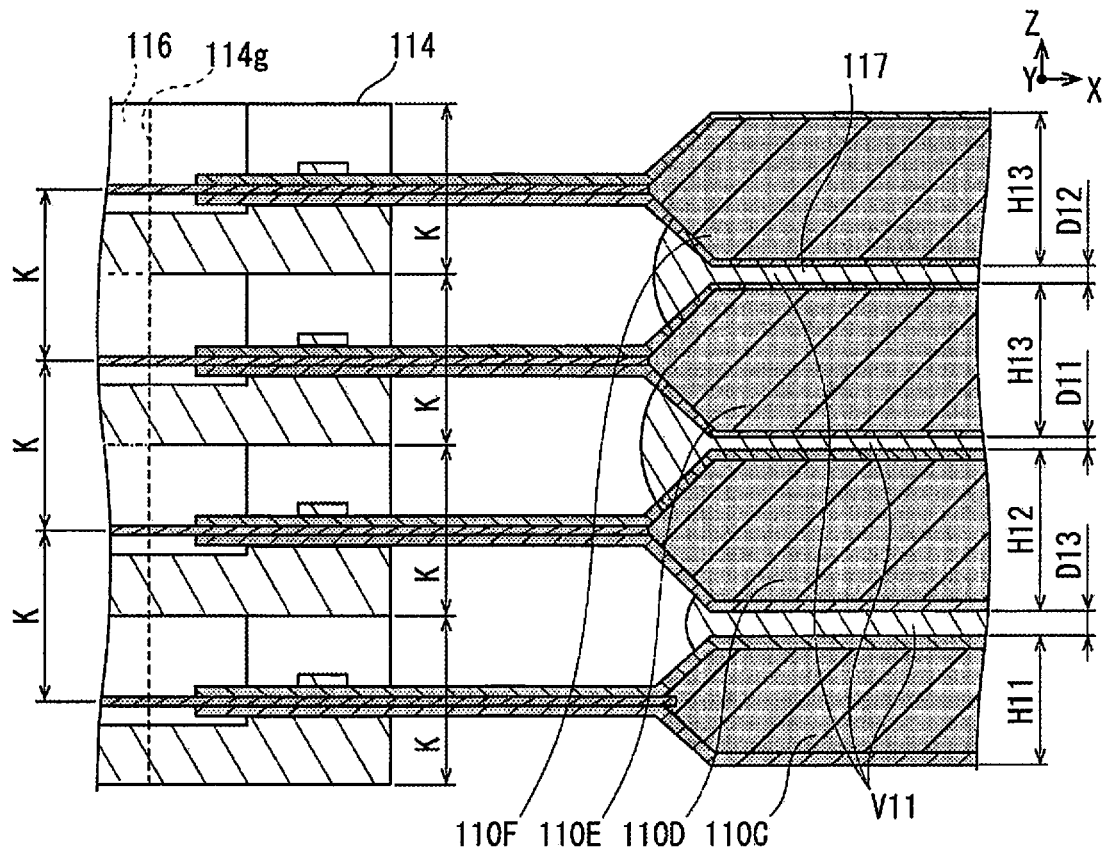
FIG. 11 is a side view in which a plurality of unit cells stacked with elastic adhesives interposed therebetween are schematically shown in cross-section based on conditions shown in FIG. 10.

Referring to FIG. 11, the method for producing the battery pack 100 according to the embodiment is, in a generic sense, a method for producing the battery pack 100 in which a plurality of unit cells 110 are stacked with filler members (elastic adhesives 117) interposed therebetween, and the stacked unit cells 110 are electrically connected. The method for producing the battery pack 100 has a measurement step S101 of measuring a thickness of the unit cells 110, an arrangement step S103 of arranging the viscous elastic adhesives 117 between the unit cells 110 which are adjacent in the stacking direction Z, and a pressurization step S104 in which the viscous elastic adhesives 117 arranged between the unit cells 110 are pressurized in the stacking direction Z interposed by the unit cells 110 and thickness of the elastic adhesives 117 in the stacking direction Z is reduced. In the method for producing the battery pack 100, based on the measured thicknesses of each of the unit cells 110 that are adjacent after stacking, the thickness of the elastic adhesives 117 in the stacking direction Z is controlled through at least one of the following: an amount of elastic adhesives 117 arranged in the arrangement step S103; a length of time during which the elastic adhesives 117 are pressurized in the pressurization step S104; and a magnitude of force by which the elastic adhesives 117 are pressurized in the pressurization step S104. Distances between stacking-direction centers of two of the unit cells 110 adjacent in the stacking direction Z are kept within a constant range.

A plurality of battery packs 100 are mounted in a vehicle such as an electric automobile, and are used as a power source for driving a vehicle motor. The battery pack 100 is configured by being electrically connected by a busbar unit 130 in a state in which a stack 100S, which is obtained by stacking a plurality of the unit cells 110 with the elastic adhesives 117 interposed therebetween, has been pressurized by a pressurization unit 120.

The configuration of the battery pack 100 (the stack 100S, the pressurization unit 120, and the busbar unit 130) will be described with reference to FIGS. 1 to 6.

Figure 2:
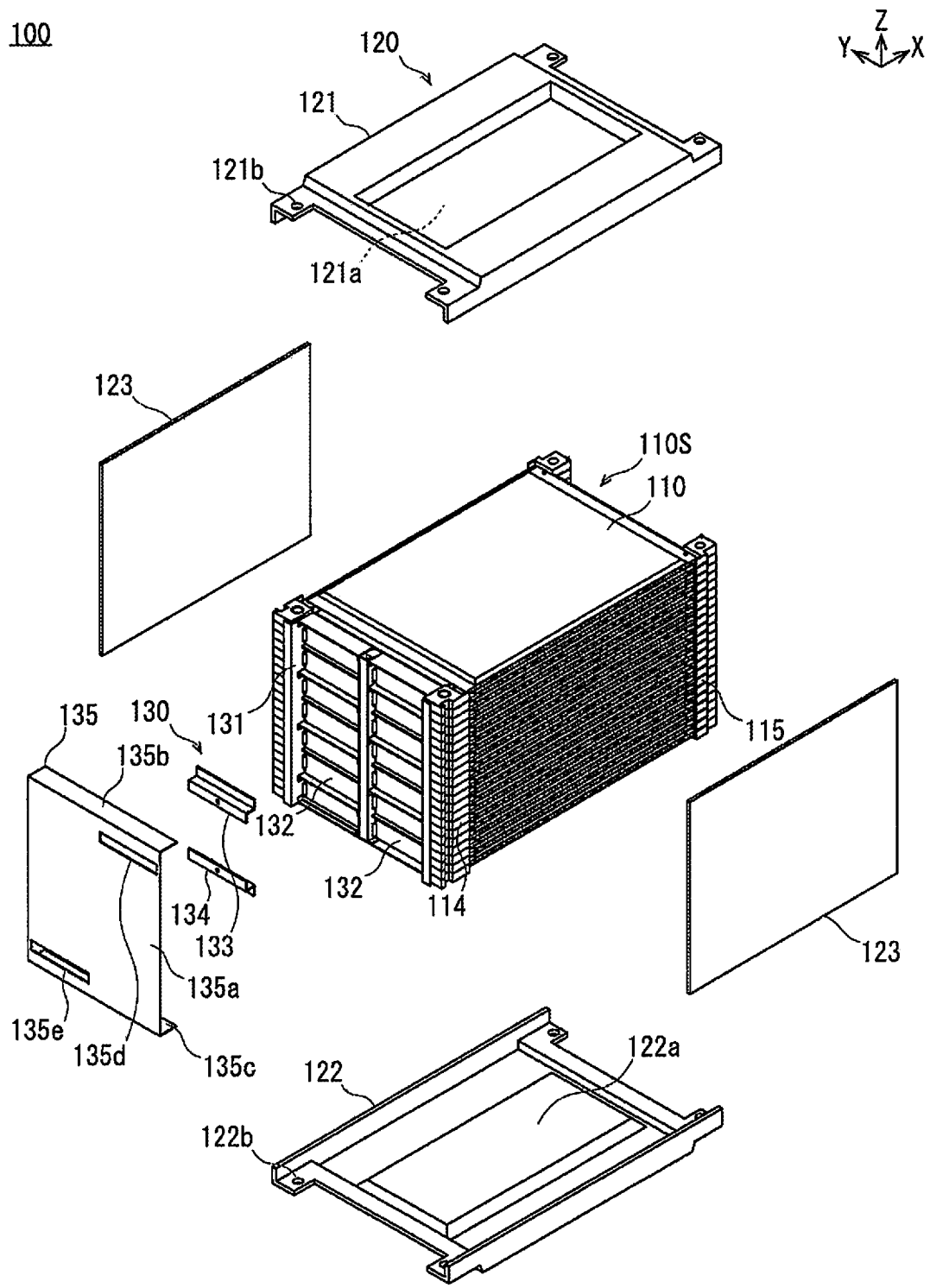
FIG. 2 is a perspective view showing a state in which a pressurization unit (left and right side plates of an upper pressurization plate and a lower pressurization plate) has been detached and parts of a busbar unit (protective cover, anode-side terminal, and cathode-side terminal) have been detached from the battery pack shown in FIG. 1.
Figure 3A:
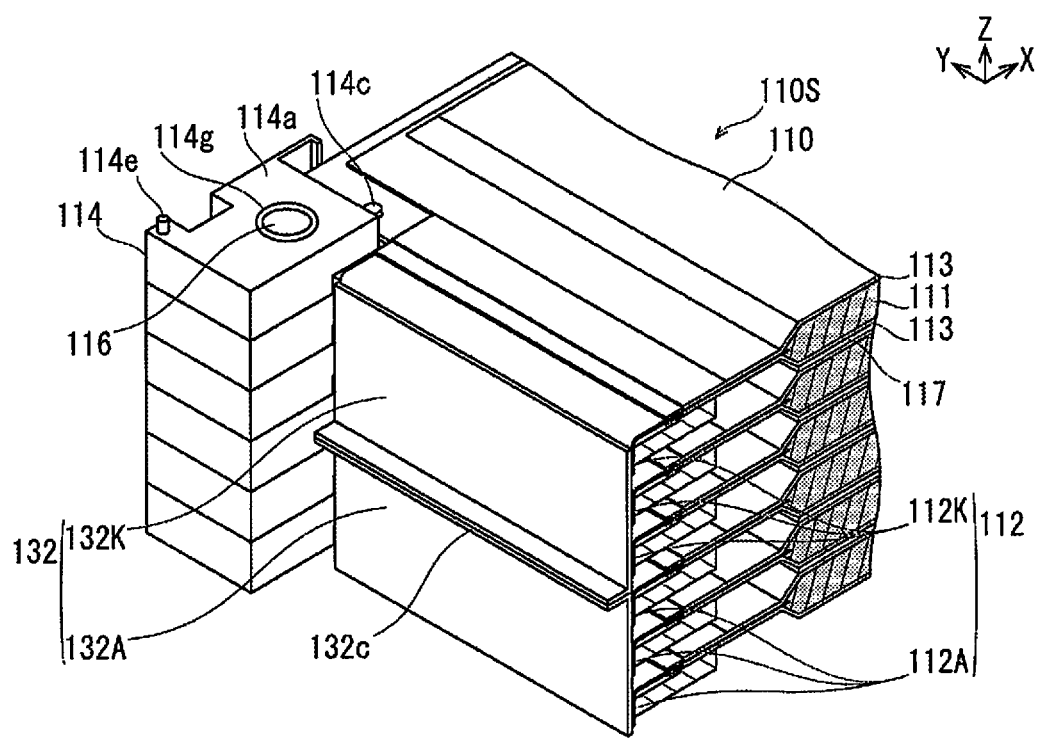
FIG. 3A is a perspective view showing, by cross section, a main part in the state in which a busbar has been joined to the electrode tabs of stacked unit cells.
Figure 3B:
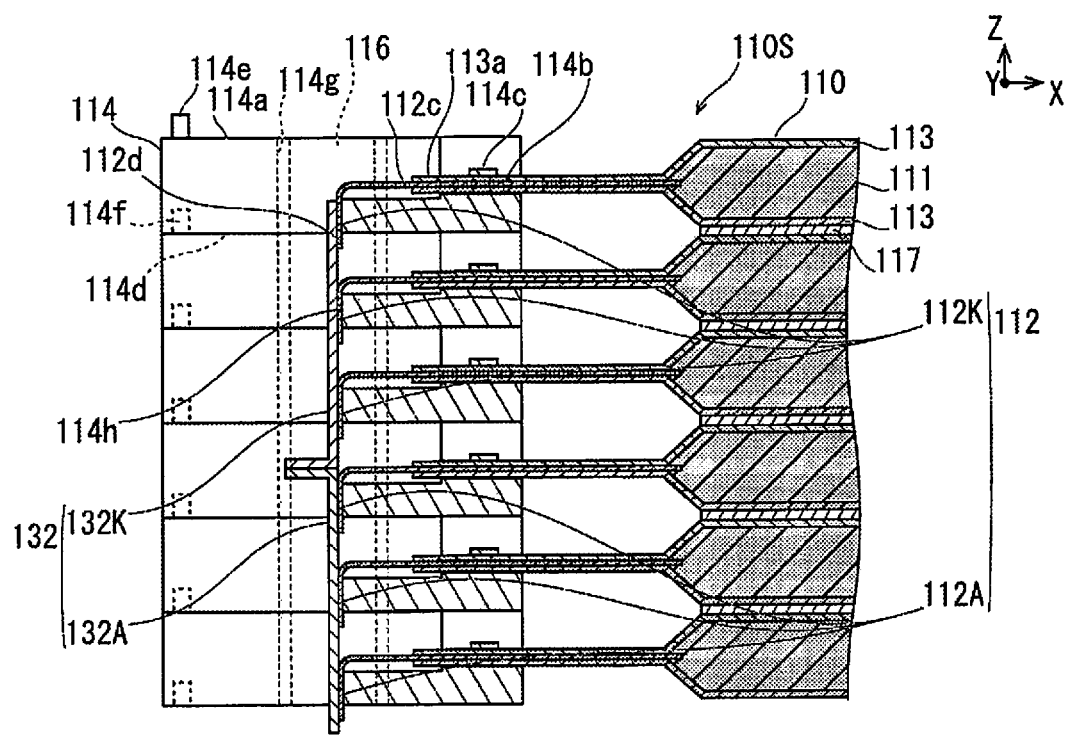
FIG. 3B is a cross-sectional view showing FIG. 3A from a side.
Figure 4:
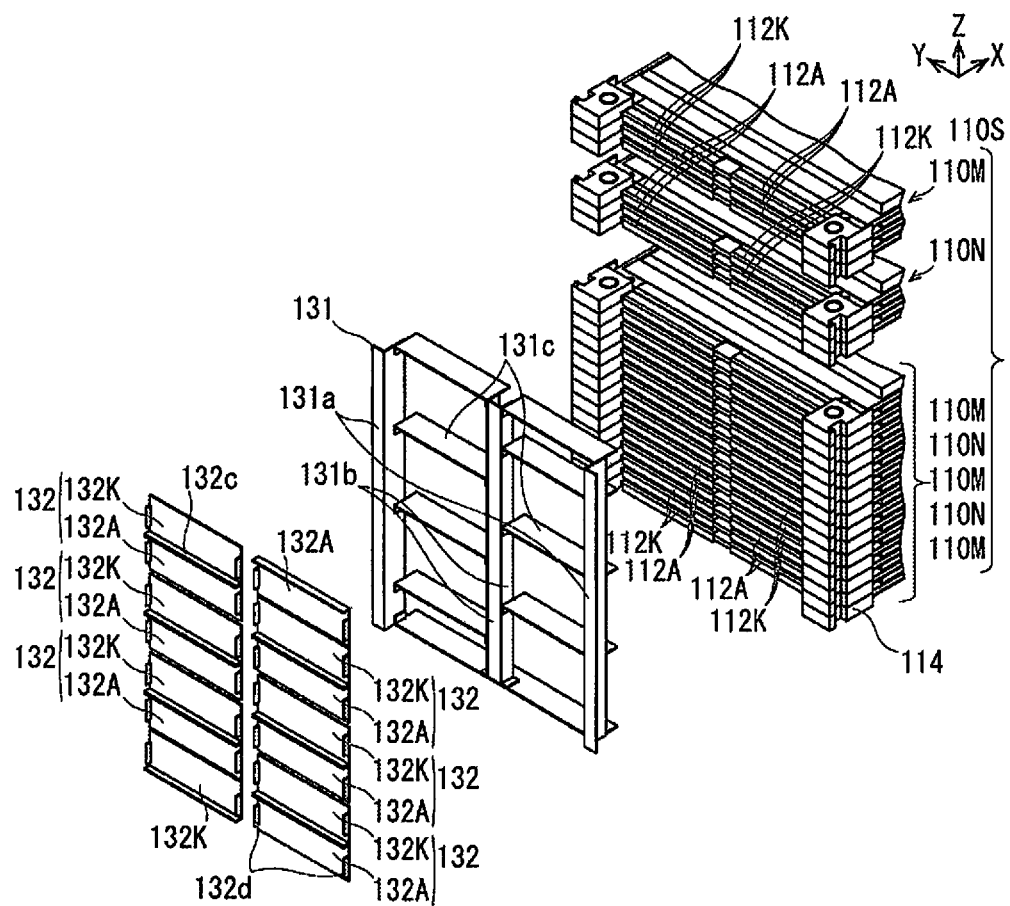
FIG. 4 is a perspective view showing a state in which a busbar holder and the busbars have been detached from the stack shown in FIG. 2.
Figure 5:
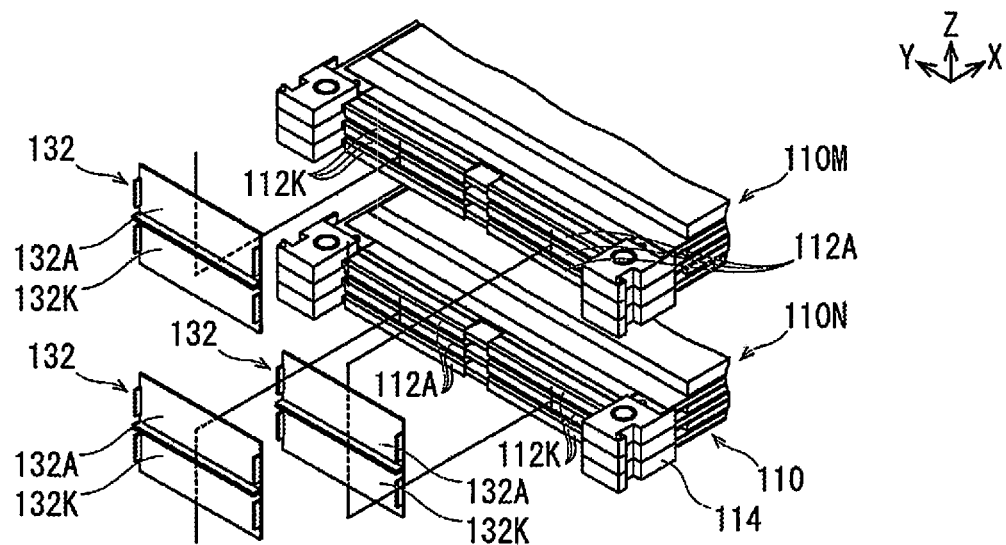
FIG. 5 is a perspective view showing a state in which a first cell subassembly and a second cell subassembly shown in FIG. 4 are electrically connected by the busbars.
Figure 6:
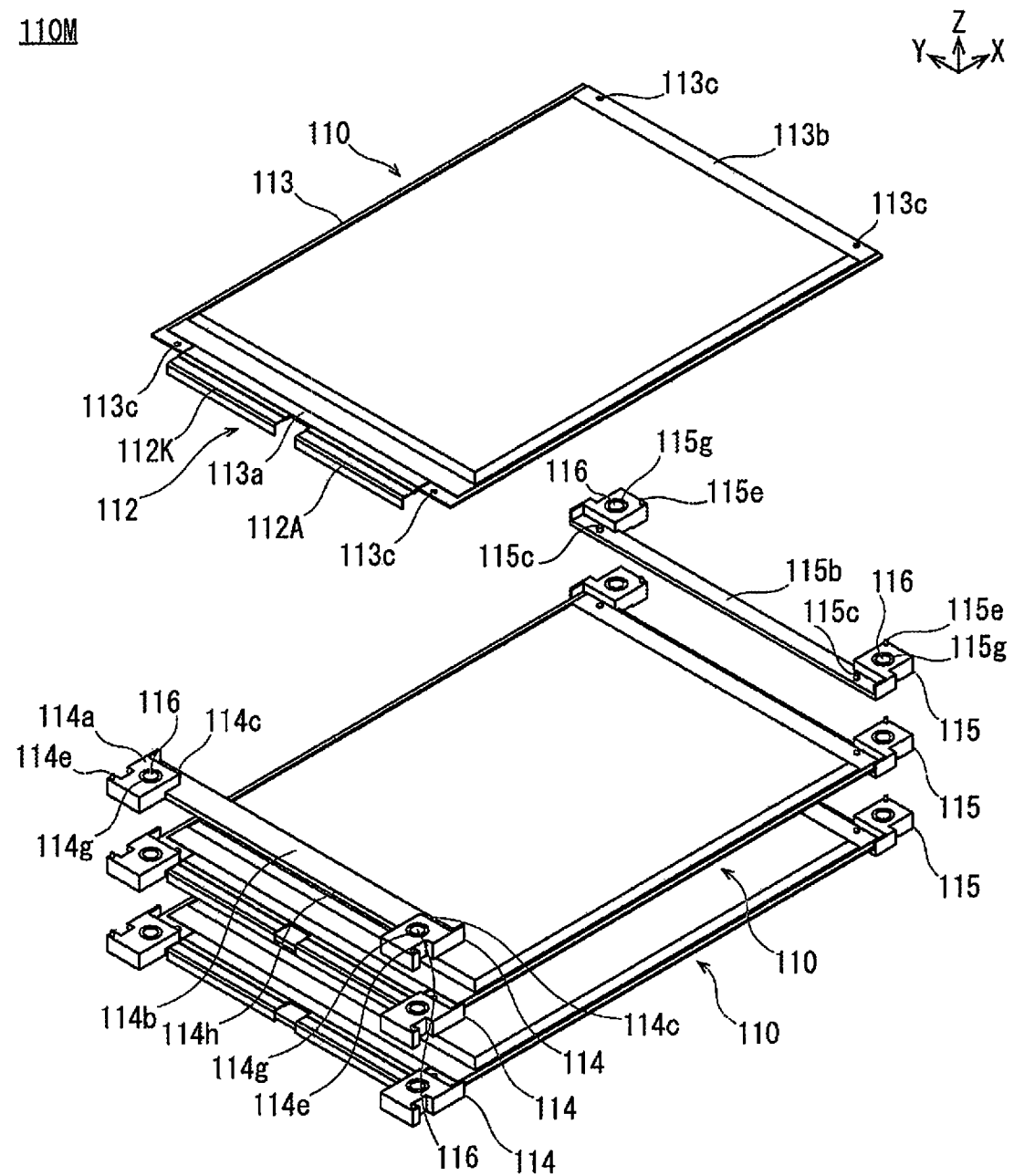
FIG. 6 is a perspective view showing a state in which the first cell subassembly (a set of three of the unit cells connected in parallel) shown in FIG. 4 has been disassembled for each unit cell, and a first spacer and a second spacer have been detached from one (uppermost) of the unit cells.

FIG. 1 is a perspective view showing the battery pack 100 according to the present embodiment. FIG. 2 is a perspective view showing a state in which the pressurization unit 120 (left and right side plates 123 of an upper pressurization plate 121 and a lower pressurization plate 122) has been detached and parts (protective cover 135, anode-side terminal 133, and cathode-side terminal 134) of a busbar unit 130 have been detached from the battery pack 100 shown in FIG. 1. FIG. 3A is a perspective view showing, by cross section, a main part in a state in which the busbar 132 has been joined to electrode tabs 112 of the stacked unit cells 110; FIG. 3B is a cross-sectional view showing FIG. 3A from a side. FIG. 4 is a perspective view showing a state in which a busbar holder 131 and the busbars 132 have been detached from the stack 100S shown in FIG. 2. FIG. 5 is a perspective view showing a state in which a first cell subassembly 110M and a second cell subassembly 110N shown in FIG. 4 are electrically connected by busbars 132. FIG. 6 is a perspective view showing a state in which the first cell subassembly 110M (a set of three unit cells 110 connected in parallel) shown in FIG. 4 has been disassembled for each unit cell 110, and a first spacer 114 and a second spacer 115 have been detached from one (uppermost) of the unit cells 110.

The configuration of the stack 100S is described in detail below.

The stack 100S is configured by connecting, in series and in alternating fashion, the first cell subassembly 110M comprising three of the unit cells 110 electrically connected in parallel, and the second cell subassembly 110N comprising three unit cells 110 electrically connected in parallel, as shown in FIG. 4.

The first cell subassembly 110M corresponds to the four of the unit cells 110 positioned in a first tier (lowermost tier), a third tier, a fifth tier, and a seventh tier (uppermost tier) in the battery pack 100, as shown in FIG. 4. The second cell subassembly 110N corresponds to the three of the unit cells 110 positioned in a second tier, fourth tier, and sixth tier in the battery pack 100, as shown in FIG. 4.

The first cell subassembly 110M and the second cell subassembly 110N have the same configuration. However, the first cell subassembly 110M and the second cell subassembly 110N are arranged such that by vertically flipping the three of the unit cells 110, three anode-side electrode tabs 112A and three cathode-side electrode tabs 112K are positioned in alternating fashion along the stacking direction Z, as shown in FIGS. 4 and 5.

In the first cell subassembly 110M, all of the anode-side electrode tabs 112A are positioned to a right side in the drawings, and all of the cathode-side electrode tabs 112K are positioned to a left side in the drawings, as shown in FIGS. 4 and 5.

In the second cell subassembly 110N, all of the anode-side electrode tabs 112A are positioned to the left side in the drawings, and all of the cathode-side electrode tabs 112K are positioned to the right side in the drawings, as shown in FIGS. 4 and 5. Merely by flipping the vertical arrangement of each of the three unit cells 110, orientations of distal end parts 112d of the electrode tabs 112 can vary vertically along the stacking direction Z. Therefore, individual distal end parts 112d are bent downward so that the orientations of the distal end parts 112d of the electrode tabs 112 of all of the unit cells 110 are all the same.

The unit cells 110 correspond to, e.g., lithium ion secondary cells. A plurality of the unit cells 110 are connected in series to meet the specification for drive voltage of the vehicle motor. A plurality of the unit cells 110 are connected in parallel to ensure cell capacity and extend a travel distance of a vehicle.

The unit cells 110 include: a flat power generation element 111 for charging and discharging; electrode tabs 112 drawn out from the power generation element 111, the distal end parts 112d being bent along the stacking direction Z; and a laminate film 113 that seals the power generation element 111, as shown in FIGS. 3A and 3B.

The power generation elements 111, having been charged with power from an outdoor charging stand, etc., discharge to the vehicle motor, etc., to supply drive power. The power generation elements 111 are constituted by stacking a plurality of sets of anodes and cathodes separated by a separator.

The electrode tabs 112 allow the power generation elements 111 to be exposed to the exterior, as shown in FIGS. 3A, 3B, and 4. The electrode tabs 112 are configured from anode-side electrode tabs 112A and cathode-side electrode tabs 112K. The proximal-end side of the anode-side electrode tabs 112A is joined to all of the anodes included in a single power generation element 111. The anode-side electrode tabs 112A are formed in a thin-plate shape and are made of aluminum in conformity with the characteristics of an anode. The proximal-end side of the cathode-side electrode tabs 112K is joined to all of the cathodes included in a single power generation element 111. The cathode-side electrode tabs 112K are formed in a thin-plate shape and are made of copper in conformity with the characteristics of a cathode.

The electrode tabs 112 are formed to assume the shape of the letter "L", as shown in FIG. 3B. The proximal end parts 112c of the electrode tabs 112 are supported from below by a support surface 114b of a first spacer 114. The distal end parts 112d of the electrode tabs 112 are bent downward in the stacking direction Z and face a contact surface 114h of the first spacer 114.

Laminate films 113 form a pair, which sandwich and seal the power generation elements 111 from above and below along the stacking direction Z, as shown in FIGS. 3A and 3B. The pair of laminate films 113 allow the anode-side electrode tabs 112A and the cathode-side electrode tabs 112K to be drawn out toward the exterior from a gap in one end part 113a that follows the short-axis direction Y.

The unit cells 110 are stacked as shown in FIGS. 3A, 3B and 4 while supported by pairs of spacers (the first spacers 114 and the second spacers 115), as shown in FIG. 6.

The pairs of spacers (the first spacers 114 and the second spacers 115) are arranged at constant intervals along the stacking direction Z of the unit cells 110, as shown in FIGS. 2, 3A, and 3B. The first spacers 114 support the unit cells 110 on the side provided with the electrode tabs 112. The second spacers 115 support the unit cells 110 on the side that is not provided with the electrode tabs 112, so as to face in the long-axis direction X of the first spacers 114 and the unit cells 110.

As shown in FIG. 6, the first spacer 114 is formed in a long plate shape provided with recesses and protrusions, and is made of reinforced plastic provided with insulating properties. The first spacer 114 is provided so as to face one end part 113a of the pair of laminate films 113. The first spacer 114 supports the one end part 113a of the laminate films 113 by means of a flat support surface 114b, as shown in FIGS. 3B and 6. The first spacer 114 is provided with a contact surface 114h on a wall surface that follows the stacking direction Z, adjacent to the support surface 114b. On the contact surface 114b, the distal end parts 112d of the electrode tabs 112 are positioned along the long-axis direction X, as shown in FIG. 3B. The first spacer 114 is provided with a pair of linking pins 114c protruding upward at both ends of the support surface 114b along the short-axis direction Y, as shown in FIG. 6. The pairs of linking pins 114c are formed as circular columns and are inserted into linking holes 113c that open in both ends of the one-end parts 113a of the lamination films 113, along the short-axis direction Y, thereby positioning the unit cells 110.

As shown in FIG. 3B, upper surfaces 114a of the first spacers 114 and lower surfaces 114d of adjacent ones of first spacers 114 abut each other. As shown in FIG. 3B, circular-column-shaped positioning pins 114e that protrude from the upper surfaces 114a of the first spacers 114 are fitted into positioning holes 114f that open in the lower surfaces 114d of the adjacent first spacers 114, whereby the first spacers 114 are positioned with each other. The first spacers 114 are provided with locating holes 114g at both ends along the short-axis direction Y, as shown in FIG. 6. The locating holes 114g have a collar 116 inserted therein.

The first spacers 114 are provided with locating holes 114g at both ends along the short-axis direction Y as shown in FIG. 6. Bolts that link together a plurality of battery packs 100 while positioning the battery packs 100 along the stacking direction Z are inserted into the locating holes 114g.

The second spacers 115 do not need to support the electrode tabs 112 and are therefore a simplified configuration of the first spacers 114. The second spacers 115 support, by means of a support surface 115b, another end part 113b facing the one end part 113a of the laminate films 113 along the long-axis direction X. As with the first spacers 114, the second spacers 115 are provided with a positioning pin 115e that positions the second spacers, a linking pin 115c that positions the unit cells 110, and locating holes 115g through which are inserted bolts that position and link a plurality of battery packs 100 together, as shown in FIG. 6.

The collars 116 are formed as circular columns and are made of a metal provided with sufficient strength. The collars 116 are inserted into each of the pairs of locating holes 114g of the first spacers 114 and locating holes 115g of the second spacers 115. Bolts (not shown) that position and link the plurality of battery packs 100 together are inserted into the collars 116. The collars 116 reinforce the first spacers 114 and the second spacers 115 along the stacking direction Z. The amount of deformation of the collars 116 along the stacking direction Z is substantially lower than with the first spacers 114 and the second spacers 115. In other words, the collars 116 function as restricting members that regulate the intervals between stacked first spacers 114 and second spacers so that the intervals are constant.

The elastic adhesives 117 (filling members) are disposed in gaps between unit cells 110 that are vertically adjacent along the stacking direction Z. The elastic adhesives 117 are provided to a portion that overlaps, in the stacking direction Z, at least the power generation elements 111 included inside the unit cells 110, in at least the gaps between the unit cells 110. In the battery pack 100, surface pressure is exerted on portions of the power generation elements 111 of each of the unit cells 110 by the upper pressurization plate 121 and the lower pressurization plate 122. The elastic adhesives 117 cause changes in thickness following expansion and contraction of the unit cells 110 along the stacking direction Z. Furthermore, the elastic adhesives 117 absorb stress exerted on the laminate films 113 positioned in the outermost layers of the unit cells 110 and protect the laminate films 113 when the unit cells 110 vibrate or when impact is exerted on the unit cells 110.

The elastic adhesives 117 are, for example, a delayed-curing type of adhesive, and when these adhesives are pressurized via the unit cells 110 while in a viscous state before drying, the adhesives change in thickness. The elastic adhesives 117 have elastic force even after drying. It is preferred that contraction strain of the elastic adhesives 117 during drying be sufficiently low. After curing, the elastic adhesives 117 are viscoelastic bodies that are both viscous and elastic. The elastic adhesives 117 have, as a characteristic, a degree of viscosity such that after the thickness of the elastic adhesives 117 in the stacking direction Z has been set in a pressurization step, the elastic adhesives 117 are not crushed or reduced in thickness by the weight of the cells or the force of applied pressure of the cells stacked in the next step. In consideration of the time needed to produce the battery pack 100, a material that cures in, for example, approximately 60 minutes is used for the elastic adhesives 117. Before curing, the degree of viscosity of the elastic adhesives 117 is lower and fluidity is higher in comparison with after curing. The elastic adhesives 117 are pressurized before curing to set the thickness thereof. The elastic adhesives 117 are made from, for example, silicone, etc. A heat-curing adhesive may be used for the elastic adhesives 117.

The configuration of the pressurization unit 120 is described in detail below.

The pressurization unit 120 includes an upper pressurization plate 121 and a lower pressurization plate 122 that pressurize the power generation element 111 of each unit cell 110 of the stack 100S from above and below, and a pair of side plates 123 that secure the upper pressurization plate 121 and the lower pressurization plate 122 once the stack 100S is in a pressurized state.

The upper pressurization plate 121, together with the lower pressurization plate 122, pressurizes the power generation element 111 of each unit cell 110 while sandwiching and holding, from above and below, the plurality of unit cells 110 constituting the stack 100S, as shown in FIGS. 1 and 2. The upper pressurization plate 121 is formed in a plate shape provided with recesses and protrusions, and is made of a metal provided with sufficient rigidity. The upper pressurization plate 121 is disposed in a horizontal plane. The upper pressurization plate 121 is provided with a pressurization surface 121a that applies downward pressurization on the power generation elements 111, as shown in FIG. 2. The pressurization surface 121a is formed flat and projects downward from a portion in the center of the upper pressurization plate 121. The upper pressurization plate 121 is provided with locating holes 121b through which bolts are inserted to link battery packs 100 together. The locating holes 121b comprise through-holes and are opened at the four corners of the upper pressurization plate 121.

The lower pressurization plate 122 has the same shape as the upper pressurization plate 121, and is disposed so that the top and bottom of the upper pressurization plate 121 are flipped, as shown in FIG. 2. As with the upper pressurization plate 121, the lower pressurization plate 122 is provided with a pressurization surface 122a that applies upward pressure on the power generation elements 111, and locating holes 122b through which bolts are inserted to position and link battery packs 100 together along the stacking direction Z.

The pair of side plates 123 secure the upper pressurization plate 121 and the lower pressurization plate 122 once the stack 100S is in a pressurized state, as shown in FIGS. 1 and 2. In other words, the pair of side plates 123 keep the upper pressurization plate 121 and the lower pressurization plate 122 at a constant spacing. Also, the pair of side plates 123 cover and protect the long-axis-direction-X side surfaces of the stacked unit cells 110. The side plates 123 are formed in a plate shape and are made of metal. The pair of side plates 123 are provided upright so as to face both long-axis-direction-X side surfaces of the stacked unit cells 110. The pair of side plates 123 are welded to the upper pressurization plate 121 and the lower pressurization plate 122.

The configuration of the busbar unit 130 is described in detail below.

The busbar unit 130 includes a busbar holder 131 for integrally holding a plurality of busbars 132, busbars 132 for electrically connecting the distal end parts 112d of the electrode tabs 112 of different unit cells 110 (vertically-lined-up unit cells 110), an anode-side terminal 133 that allows the anode-side ends of the electrically connected plurality of unit cells 110 to be exposed to an external input/output terminal, and a cathode-side terminal 134 that allows the cathode-side ends of the electrically connected plurality of unit cells 110 to be exposed to the external input/output terminal, and a protective cover 135 for protecting the busbars 132, etc.

The busbar holder 131 integrally holds the plurality of busbars 132, as shown in FIGS. 2 and 4. The busbar holder 131 integrally holds the plurality of busbars 132 in the form of a matrix so that the plurality of busbars 132 faces the electrode tabs 112 of the unit cells 110 of the stack 100S. The busbar holder 131 is composed of an insulating resin and is formed in the shape of a frame.

The busbar holder 131 is provided with a pair of brace parts 131a that stand upright along the stacking direction Z, so as to be positioned on both long-axis-direction sides of the first spacers 114 that support the electrode tabs 112 of the unit cells 110, as shown in FIG. 4. The pair of brace parts 131a fit into the side surface of the first spacers 114. The pair of brace parts 131a assumes an "L" shape when viewed along the stacking direction Z, and is formed in a plate shape extending along the stacking direction Z. The busbar holder 131 is provided with a pair of auxiliary brace parts 131b, which are set apart and stand upright along the stacking direction Z, so as to be positioned near the long-axis-direction center of the first spacers 114. The auxiliary brace parts 131b are formed in a plate shape extending along the stacking direction Z.

The busbar holder 131 is provided with insulating parts 131c that protrude between each of the busbars 132 that are mutually adjacent along the stacking direction Z, as shown in FIG. 4. The insulating parts 131c are formed in a plate shape that extends along the short-axis direction Y. Each of the insulating parts 131c is horizontally disposed between the auxiliary brace parts 131b and 131b. The insulating parts 131c prevent electrical discharge by insulating the space between the busbars 132 that are mutually adjacent along the stacking direction Z.

The busbar holder 131 can be configured by mutually joining the independently formed brace parts 131a and the auxiliary brace parts 131b and the insulating parts 131c, and may be configured by integrally molding the brace parts 131a and the auxiliary brace parts 131b and insulating parts 131c.

The busbars 132 electrically connect the electrode tabs 112 of the unit cells 110 lined up in the vertical direction, as shown in FIGS. 3A, 3B, 4, and 5. The busbars 132 electrically connect the anode-side electrode tab 112A of one unit cell 110 and the cathode-side electrode tab 112K of another unit cell 110. The busbars 132 electrically connect, e.g., three anode-side electrode tabs 112A lined up vertically in the first cell subassembly 110M and three cathode-side electrode tabs 112K lined up vertically in the second cell subassembly 110N, as shown in FIG. 5.

In other words, the busbars 132 connect, e.g., three anode-side electrode tabs 112A in parallel in the first cell subassembly 110M and connect three cathode-side electrode tabs 112K in parallel in the second cell subassembly 110N, as shown in FIG. 5. Furthermore, the busbars 132 serially connect three anode-side electrode tabs 112A in the first cell subassembly 110M and three cathode-side electrode tabs 112K in the second cell subassembly 110N. The busbars 132 are laser-welded to the anode-side electrode tab 112A of one of the unit cells 110 and the cathode-side electrode tab 112K of another one of the unit cells 110.

The busbars 132 are configured by joining anode-side busbars 132A and cathode-side busbars 132K, as shown in FIGS. 3A and 4. The anode-side busbars 132A and the cathode-side busbars 132K have the same shape, and each assumes the form of a letter "L." The busbars 132 are integrated by a joining part 132c obtained by joining one bent end of the anode-side busbars 132A and one bent end of the cathode-side busbars 132K, as shown in FIGS. 3A and 4. The anode-side busbars 132A and the cathode-side busbars 132K constituting the busbars 132 are provided with side parts 132d that join the busbar holder 131 to both short-axis-direction-Y ends, as shown in FIG. 4.

The anode-side busbars 132A are made of aluminum in the same manner as the anode-side electrode tabs 112A of the unit cells 110. The cathode-side busbars 132K are made of copper in the same manner as the cathode-side electrode tabs 112K of the unit cells 110. The anode-side busbars 132A and the cathode-side busbars 132K made of different metals are joined to each other by ultrasonic welding to form the joining part 132c.

Of the busbars 132 arranged in the form of a matrix, the busbar 132 positioned at the upper right in FIG. 4 corresponds to the anode-side end of twenty-one of the unit cells 110 (three in parallel, seven in series) and is constituted by only the anode-side busbars 132A. The anode-side busbars 132A are laser-welded to the anode-side electrode tabs 112A of the three topmost unit cells 110 of the stacked unit cells 110.

Of the busbars 132 arranged in the form of a matrix, the busbar 132 positioned at the lower left in FIG. 4 corresponds to the cathode-side end of twenty-one of the unit cells 110 (three in parallel, seven in series) and is constituted by only the cathode-side busbars 132K. The cathode-side busbars 132K are laser-welded to the cathode-side electrode tabs 112K of the three bottommost unit cells 110 of the stacked unit cells 110.

The anode-side terminal 133 allows the anode-side ends of the plurality of electrically connected unit cells 110 to be exposed to an external input/output terminal, as shown in FIGS. 1 and 2. Of the busbars 132 arranged in the form of a matrix, the anode-side terminal 133 is joined to the anode-side busbars 132A positioned in the upper right of the drawing, as shown in FIG. 2. The anode-side terminal 133 is formed in a plate shape with both ends bent, and is made of an electroconductive metal.

The cathode-side terminal 134 allows the cathode-side ends of the plurality of electrically connected unit cells 110 to be exposed to an external input-output terminal, as shown in FIGS. 1 and 2. Of the busbars 132 arranged in the form of a matrix, the cathode-side terminal 134 is joined to the cathode-side busbars 132K positioned in the lower left of the drawing, as shown in FIG. 2. The cathode-side terminal 134 has the same shape of the anode-side terminal 133 with the top and bottom flipped.

The protective cover 135 protects the busbars 132, etc., as shown in FIGS. 1 and 2. In other words, the protective cover 135 integrally covers the plurality of busbars 132 and thereby prevents each busbar 132 from coming into contact with another member, etc., to cause an electrical short circuit. The protective cover 135 is made of an insulating plastic in which one end 135b and the other end 135c of the side surface 135a standing upright along the stacking direction Z are bent in the longitudinal direction X in the manner of a claw, as shown in FIG. 2.

The protective cover 135 sandwiches and secures the busbar holder 131 from above and below by means of the one end 135b and the other end 135c while covering the busbars 132 by means of the side surface 135a. The side surface 135a of the protective cover 135 is provided with a first opening 135d, which comprises a rectangular hole and allows the anode-side terminal 133 to be exposed to the exterior, and a second opening 135e, which comprises a rectangular hole and allows the cathode-side terminal 134 to be exposed to the exterior.

A method for producing the battery pack 100 will be described with reference to FIGS. 7 to 11.

Figure 7:
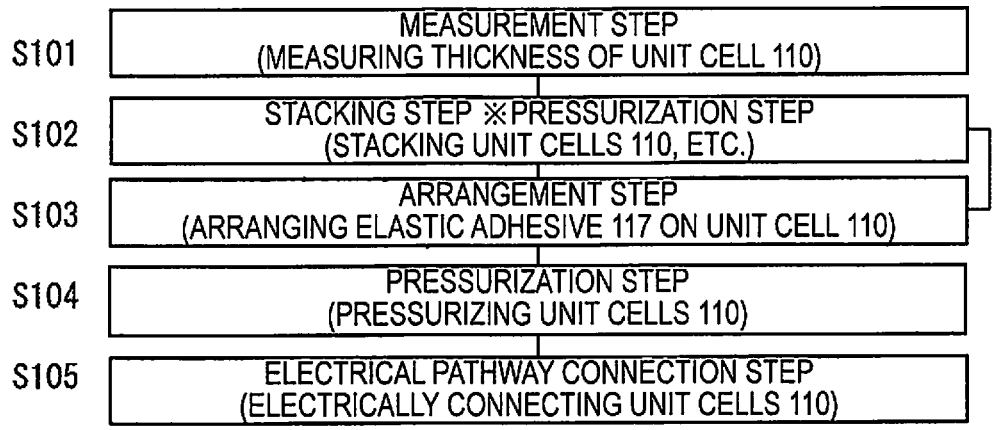
FIG. 7 is a flowchart showing the method for producing a battery pack according to a first embodiment.

FIG. 7 is a flowchart showing the method for producing the battery pack 100 according to the first embodiment. The method for producing the battery pack 100 is implemented by a measurement step S101 of measuring the thickness of the unit cells 110, a stacking step S102 of stacking the unit cells 110, etc., one at a time, an arrangement step S103 of arranging the elastic adhesives 117 provided between the unit cells 110 which are vertically adjacent along the stacking direction Z, a pressurization step S104 in which the stack 100S (the plurality of stacked unit cells 110 with the elastic adhesives 117 therebetween) is pressurized, and an electric an electrical pathway connection step S105 in which the plurality of stacked unit cells 110 are electrically connected, as shown in FIG. 7.

Figure 9A:
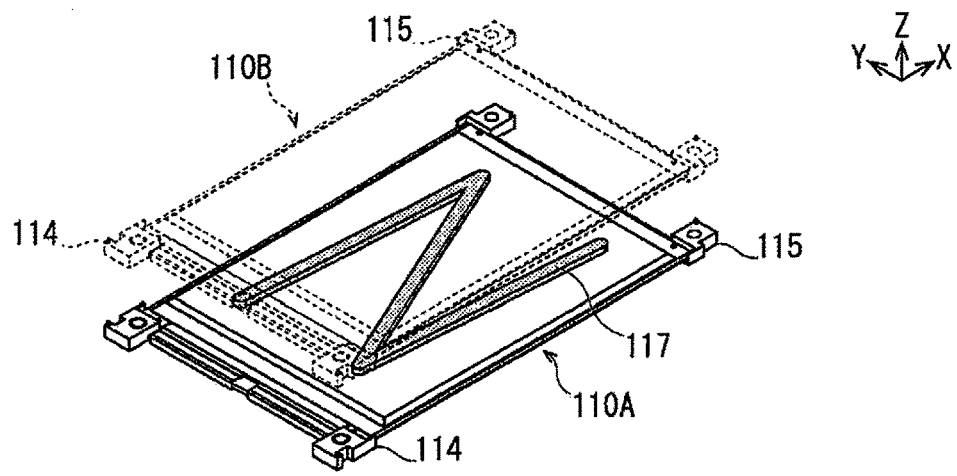
FIG. 9A is a perspective view schematically showing a state in which another unit cell (shown by dashed lines) is brought near to a first unit cell (shown by solid lines) coated with an elastic adhesive.
Figure 9B:
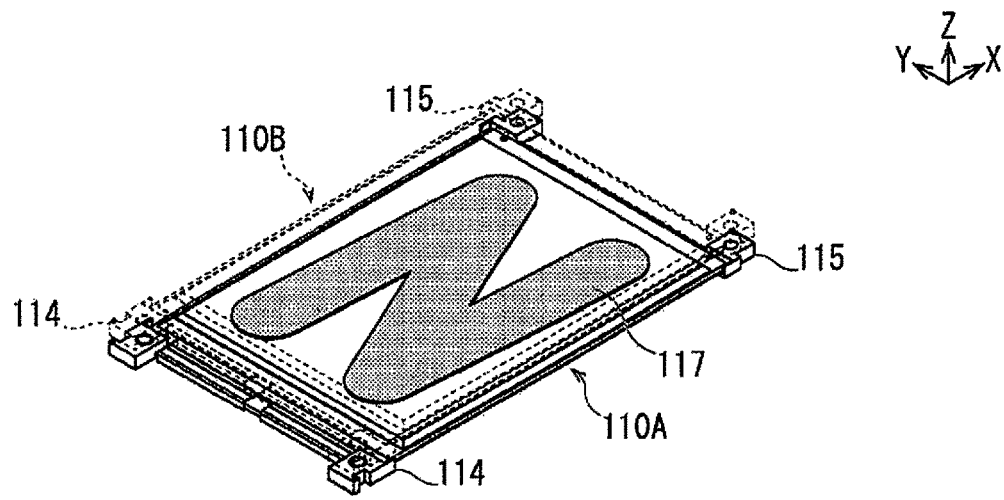
FIG. 9B, in continuation from FIG. 9A, is a perspective view schematically showing a state in which the other unit cell is brought nearer to the first unit cell, and the elastic adhesive is pushed outward by the weight of the other unit cell, etc.
Figure 9C:
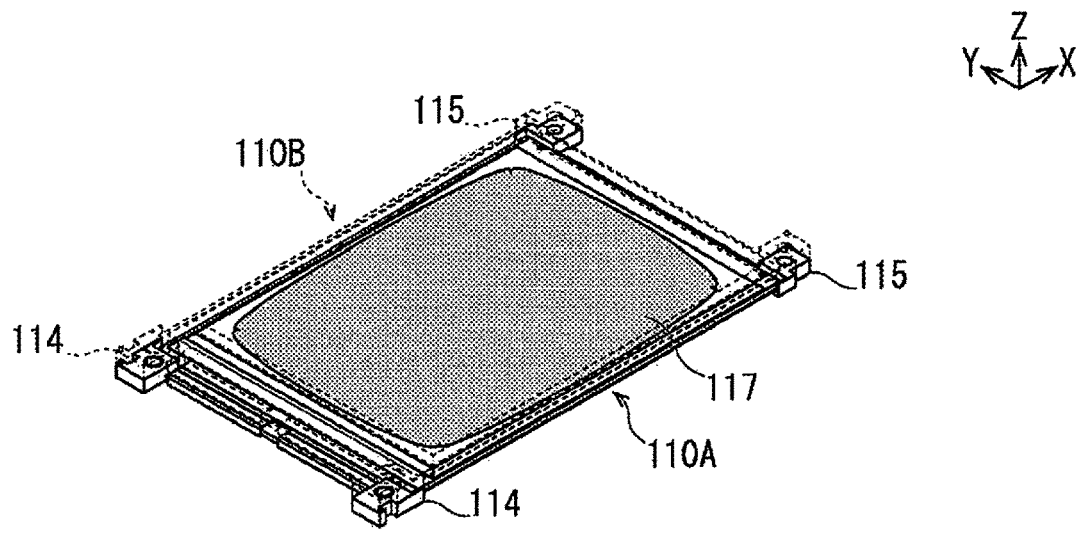
FIG. 9C, in continuation from FIG. 9B, is a perspective view schematically showing a state in which the other unit cell is brought nearer to the first unit cell, and while the elastic adhesive is pushed further outward by the weight of the other unit cell, etc., a lower surfaces of a pair of spacers attached to the other unit cell come into contact with upper surfaces of a pair of spacers attached to the first unit cell.

The stacking step S102 shown in FIG. 7 functions also as the pressurization step S104 in which the elastic adhesives 117 are pressurized and pushed outward. In other words, in the stacking step S102 shown in FIG. 7, another unit cell 110B attached to a pair of spacers (the first spacers 114 and the second spacers 115) is naturally dropped as shown in FIGS. 9A to 9C. The other unit cell 110B to which the pair of spacers (the first spacers 114 and the second spacers 115) is attached, due to weights thereof, pressurizes the elastic adhesive 117 applied on one of the unit cells 110A positioned under the other unit cell 110B. As a result, the elastic adhesive 117 applied on the one of the unit cells 110A is pressurized by the other unit cell 110B and pushed horizontally outward (in the long-axis direction X and the short-axis direction Y).

Figure 8A:
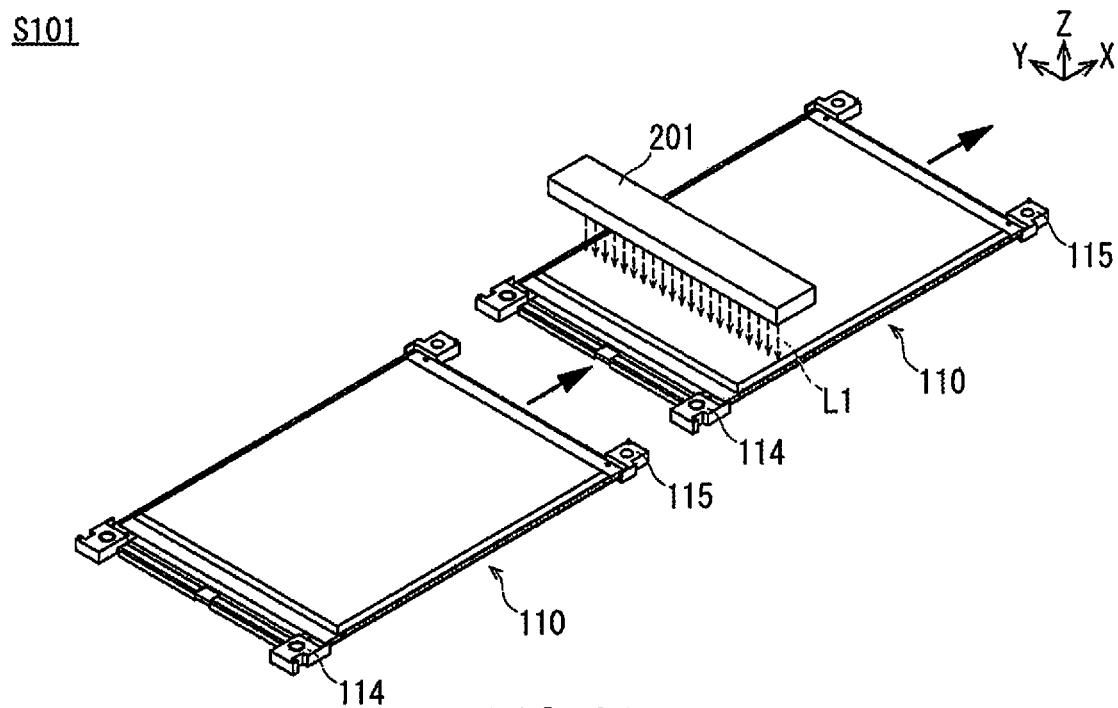
FIG. 8A is a perspective view showing the method for producing a battery pack according to the first embodiment, this view schematically showing a state in which a thickness of a unit cell attached to a pair of spacers (first spacers and second spacers) is being measured.

The step shown in FIG. 8A corresponds to the measurement step S101. FIG. 8A shows the method for producing the battery pack 100 according to the first embodiment, and schematically shows a state of measuring the thickness of the unit cell 110 attached to a pair of spacers (the first spacers 114 and the second spacers 115).

In the measurement step S101, a plurality of the unit cells 110 are continuously conveyed along the long-axis direction X by a conveying machine (not shown), and the thickness of each of the unit cells 110 along the stacking direction Z is measured by a measurement device 201, as shown in FIG. 8A. Each of the unit cells 110 is conveyed while held by suction on a suction-holding stand (not shown) provided to the conveying machine. The measurement device 201 radiates laser light L1 toward a unit cell 110 and an end of a placement stand, and measures the thickness of the unit cell 110 by measuring a difference between a focal point distance of the laser light L1 in a surface of the unit cell 110 and a focal point position of the laser light L1 in a surface of the suction-holding stand. The measurement device 201 measures the thickness of a portion in the unit cell 110 that accommodates a power generation element 111. Based on the thicknesses of the plurality of the unit cells 110 measured by the measurement device 201, a filling amount V of an elastic adhesive 117 to be applied on a unit cell 110 is determined. The filling amount V of the elastic adhesive 117 to be applied on each of the unit cells 110 is the same. Given that the thicknesses of the plurality of the unit cells 110 is kept within a constant range, the thicknesses of all of the unit cells 110 must be measured in the measurement step S101.

Figure 8B:
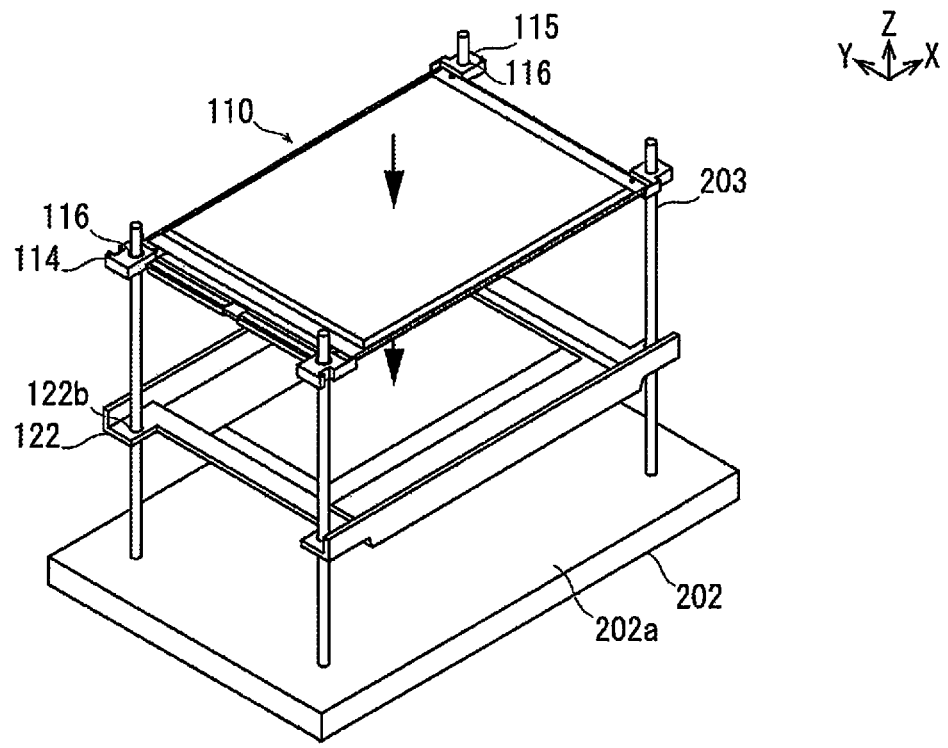
FIG. 8B, in continuation from FIG. 8A, is a perspective view schematically showing a lower pressurization plate being placed on a placement stand and one of the unit cells being stacked on the lower pressurization plate.
Figure 8C:
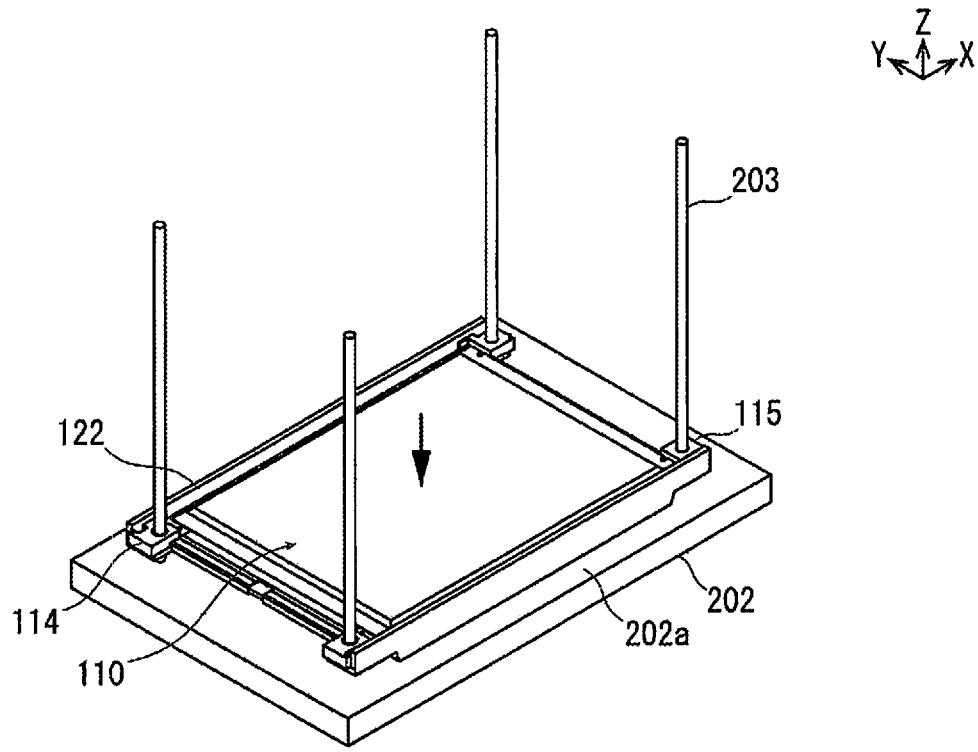
FIG. 8C, in continuation from FIG. 8B, is a perspective view schematically showing the lower pressurization plate having finished being placed on the placement stand and the one of the unit cells having finished being stacked on the lower pressurization plate.

The step shown in FIGS. 8B and 8C corresponds to the stacking step S102. In continuation from FIG. 8A, FIG. 8B schematically shows the lower pressurization plate 122 placed on a placement stand 202, and the first unit cell 110 being stacked on the lower pressurization plate 122. In continuation from FIG. 8B, FIG. 8C schematically shows a state in which the lower pressurization plate 122 has finished being placed on the placement stand 202 and the first unit cell 110 has finished being stacked on the lower pressurization plate 122.

The placement stand 202 used in the stacking step S102 is formed into a plate shape and is disposed horizontally (along the long-axis direction X and the short-axis direction Y), as shown in FIG. 8B. The placement stand 202 is provided with locating braces 203 for positioning. Four locating braces 203 stand upright at predetermined intervals on a placement surface 202a of the placement stand 202. The locating braces 203 align the relative positions of the lower pressurization plate 122, the pair of spacers (the first spacers 114 and the second spacers 115) attached to the unit cells 110, and the upper pressurization plate 121. Each of the stacked members is stacked one at a time by a robot arm, a hand lifter, a vacuum-contact-type collet, etc. (none of which are shown).

The locating holes 122b provided at the four corners of the lower pressurization plate 122 are slipped over the four locating braces 203, as shown in FIGS. 8B and 8C. In this state, the lower pressurization plate 122 is placed on the placement surface 202a of the placement stand 202 in the process of the lower pressurization plate 122 being lowered along the stacking direction Z. Next, a pair of the collars 116 provided at both ends of the first spacer 114 and a pair of the collars 116 provided at both ends of the second spacer 115 are slipped over the four locating braces 203. In this state, the first unit cell 110 is stacked on the lower pressurization plate 122 in the process of the pair of spacers (the first spacer 114 and the second spacer 115) attached to the unit cell 110 being lowered along the stacking direction Z.

Figure 8D:
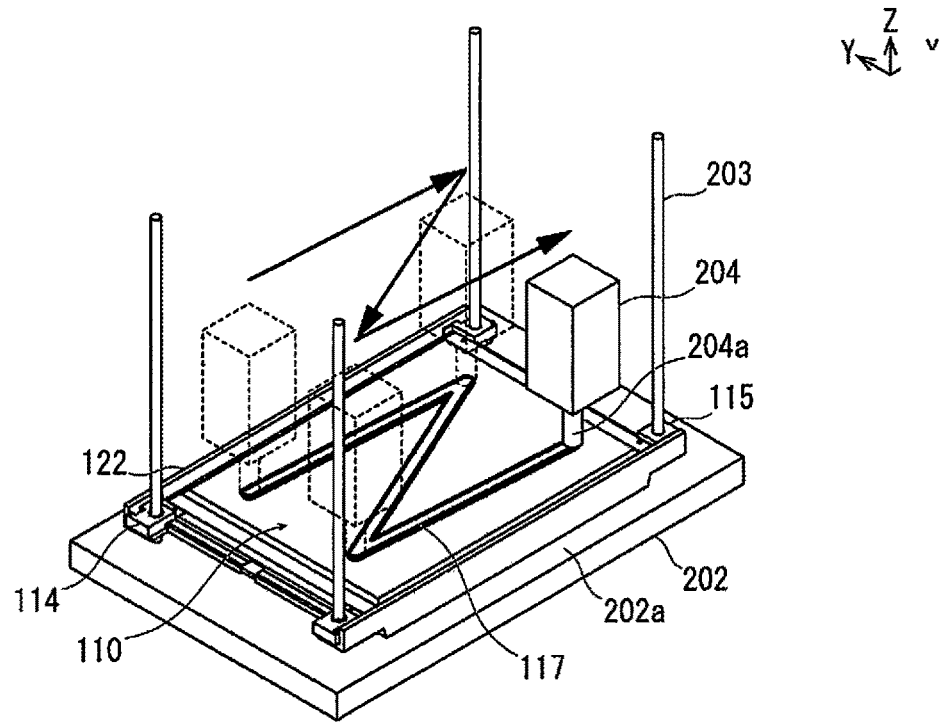
FIG. 8D, in continuation from FIG. 8C, is a perspective view schematically showing a state in which the unit cell stacked on the lower pressurization plate is coated with an elastic adhesive.

The step shown in FIG. 8D corresponds to the arrangement step S103. In continuation from FIG. 8C, FIG. 8D schematically shows a state in which the elastic adhesive 117 has been applied to the unit cell 110 stacked on the lower pressurization plate 122.

The elastic adhesive 117 is applied to the unit cell 110 by an applicator 204, as shown in FIG. 8D. The applicator 204 is a "coater." The elastic adhesive 117 is supplied to the applicator 204 from a tank (not shown) for storage via a deformable tube (not shown). The applicator 204 applies the elastic adhesive 117 discharged from a nozzle 204a in the form of, for example, a letter "N" onto the unit cell 110. The applicator 204 is moved by a robot arm (not shown) or an electrically powered stage (not shown).

Figure 8E:
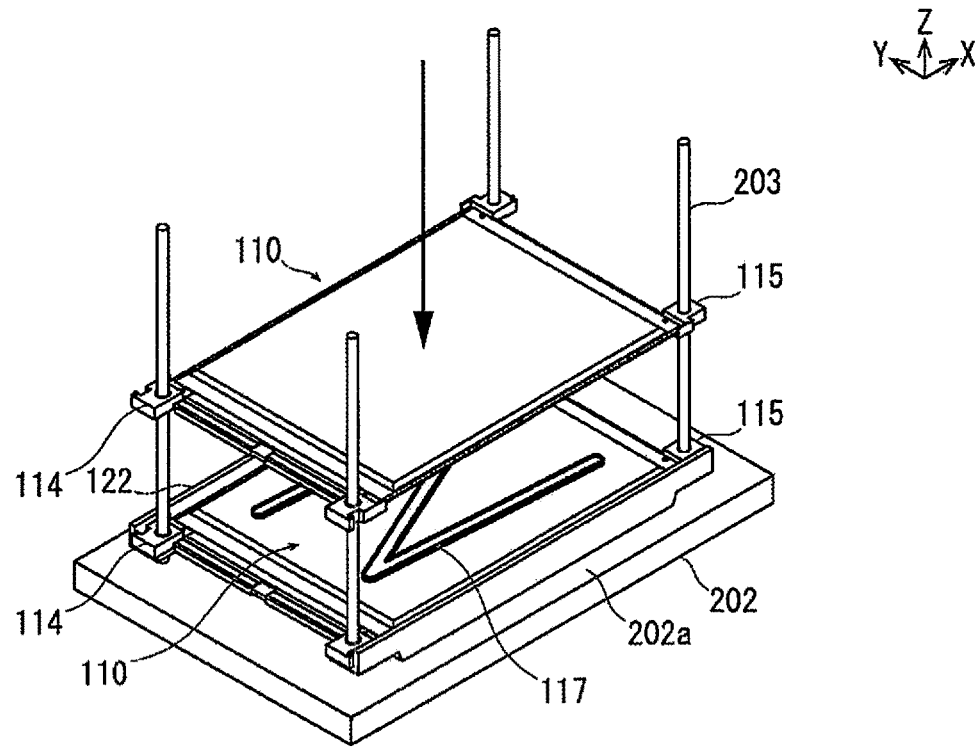
FIG. 8E, in continuation from FIG. 8D, is a perspective view schematically showing another one of the unit cells being stacked on the first unit cell coated with the elastic adhesive.

The step shown in FIG. 8E corresponds to the stacking step S102. In this embodiment, the stacking step S102 shown in FIG. 8E functions as the pressurization step S104 in which the elastic adhesive 117 applied to the unit cell 110 is pressurized and pushed outward. In continuation from FIG. 8D, FIG. 8E schematically shows another unit cell 110 in the process of being stacked on the unit cell 110 coated with the elastic adhesive 117.

The stacking step S102 shown in FIG. 8E functions also as the pressurization step S104 in which the elastic adhesive 117 is pressurized along the stacking direction Z and the elastic adhesive 117 is thereby pushed horizontally outward (along the long-axis direction X and the short-axis direction Y), as shown in FIGS. 9A to 9C.

The stacking step S102 (functioning also as the pressurization step S104 for the elastic adhesive 117) shown in FIG. 8E will be described with reference to FIGS. 9A to 9C, 10, and 11.

Another unit cell 110B (shown by dashed lines) descends upon the first unit cell 110A (shown by solid lines) coated with the elastic adhesive 117, as shown in FIG. 9A. The other unit cell 110B to which the pair of spacers (the first spacers 114 and the second spacers 115) are attached, due to the weights thereof, naturally falls along the stacking direction Z.

The naturally falling other unit cell 110B draws nearer to the first unit cell 110A as shown in FIGS. 9A and 9B. As a result, a lower surface of the other unit cell 110B comes into contact with the elastic adhesive 117 applied to the first unit cell 110A. The elastic adhesive 117 applied to the first unit cell 110A is pushed horizontally outward (in the long-axis direction X and the short-axis direction Y) by the weight of the other unit cell 110B and the weight of the pair of spacers (the first spacers 114 and the second spacers 115) attached to the other unit cell 110B.

The naturally falling other unit cell 110B draws nearer to the first unit cell 110A as shown in FIGS. 9B and 9C. In a gap between the other unit cell 110B and the first unit cell 110A, the elastic adhesive 117 applied thereon is pushed further horizontally outward (along the long-axis direction X and the short-axis direction Y). The elastic adhesive 117 is spread horizontally (in the long-axis direction X and the short-axis direction Y) so as to fill in a gap between a region of a large part of the upper surface of the first unit cell 110A and a region of a large part of the lower surface of the other unit cell 110B. In other words, when the stacked unit cells 110 are pressurized against each other, sufficient surface pressure is exerted on the power generation elements 111 of each of the unit cells 110 via the elastic adhesives 117.

Finally, lower surfaces of the pair of spacers (the first spacers 114 and the second spacers 115) attached to the other unit cell 110B come into contact with upper surfaces of the pair of spacers (the first spacers 114 and the second spacers 115) attached to the first unit cell 110A and stop, as shown in FIG. 9C. The respective hard collars 116 are slipped along the stacking direction Z over both ends of the pair of spacers (the first spacers 114 and the second spacers 115). The plurality of collars 116 function as stoppers for regulating and stopping the position of the other unit cell 110B naturally falling toward the first unit cell 110A. Intervals in the positions of the collars 116 between the first unit cell 110A and the other unit cell 110B are strictly regulated by the collars 116.

Figure 10:
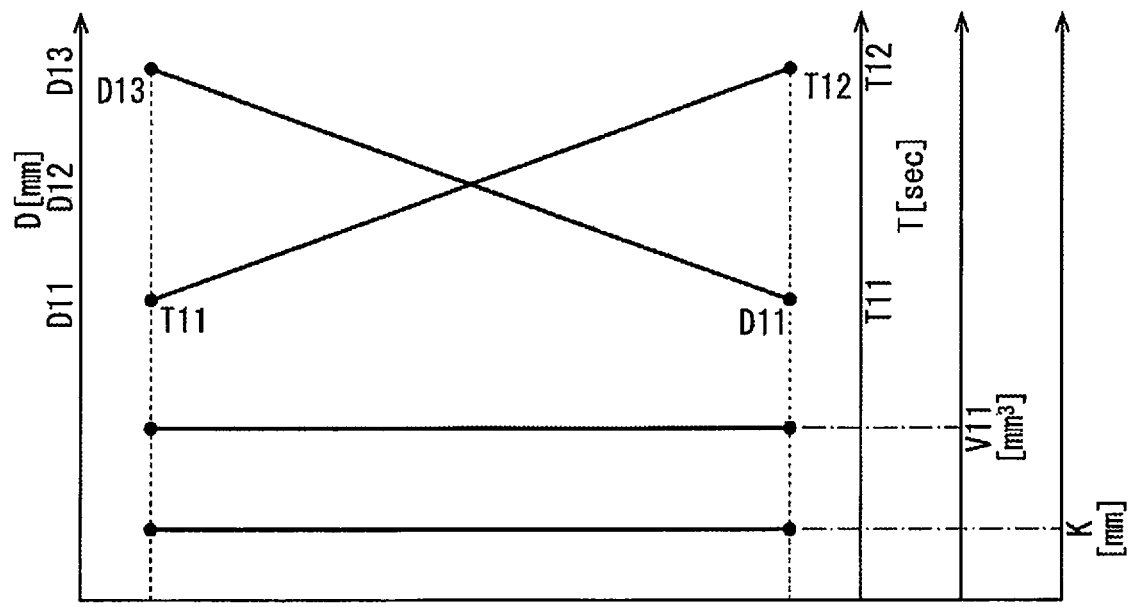
FIG. 10 is a chart showing, inter alia, a relationship between a gap in unit cells vertically adjacent along the stacking direction and pressurization time of the elastic adhesive pressurized via the unit cells.

FIG. 10 shows, inter alia, a relationship between gaps in unit cells 110 that are vertically adjacent along the stacking direction Z, and pressurization time of the elastic adhesives 117 pressurized via the unit cells 110 (the time needed to stack the other unit cell 110B on the first unit cell 110A). FIG. 11 schematically shows a plurality of unit cells 110 stacked with elastic adhesives 117 therebetween, based on conditions shown in FIG. 10.

Intervals K between a plurality of stacked unit cells 110C to 110F along the stacking direction Z are made to be the same, as shown in FIGS. 10 and 11. The intervals K are regulated by the collars 116 slipped over each of the pair of spacers (the first spacers 114 and the second spacers 115).

As shown in FIG. 11, among the plurality of stacked unit cells 110, a thickness of a lowest positioned unit cell 110C is designated as H11, a thickness of a unit cell 110D positioned directly above the unit cell 110C is designated as H12, a thickness of a unit cell 110E positioned directly above the unit cell 110D is designated as H13, and a thickness of a unit cell 110F positioned directly above the unit cell 110E is designated as H13, these thicknesses having a relationship of, for example, H12>H13>H11. In such a case, a gap D13 between the unit cell 110C and the unit cell 110D is wider (larger) than a gap D11 between the unit cell 110D and the unit cell 110E, as shown in FIG. 11. The gap D11 between the unit cell 110D and the unit cell 110E is narrower (smaller) than a gap D12 between the unit cell 110E and the unit cell 110F.

A filling amount V11 of the elastic adhesives 117 applied on each of the unit cells 110 is the same regardless of the sizes of the gaps (D11 to D13) of the vertically unit cells 110 that are adjacent after stacking, as shown in FIGS. 10 and 11. As a result, the elastic adhesives 117 overflow in different quantities out from between the unit cell 110C and the unit cell 110D, between the unit cell 110D and the unit cell 110E, and between the unit cell 110E and the unit cell 110F. In any case, in the unit cells 110 positioned relatively lower and the unit cells 110 positioned relatively higher, the filling amount V11 of the elastic adhesives 117 for the unit cells 110 is determined so that the elastic adhesives 117 are present in the portions of each of the unit cells 110 where surface pressure must be exerted on the power generation elements 111. In other words, the filling amount V11 of the elastic adhesives 117 is determined with the presupposition that this filling amount V11 can be appropriated for the relatively largest gap D13.

Stacking times (T12>T11) of the unit cells 110 differ according to the sizes of the gaps (D13>D12>D12) between the vertically unit cells 110 that are adjacent after stacking, as shown in FIG. 10. As the gaps between the vertically unit cells 110 that are adjacent after stacking become larger, the proportion at which the elastic adhesives 117 are pushed horizontally outward (in the long-axis direction X and the short-axis direction Y) by the unit cells 110 commensurately decreases, and the stacking time of the unit cells 110 therefore becomes shorter. For example, when the gap between vertically adjacent unit cells 110 is D13, a stacking time T11 is shorter in comparison with a stacking time T12 when the gap between vertically adjacent unit cells 110 is D11.

The arrangement step S103 shown in FIG. 8D and the stacking step S102 shown in FIG. 8E are alternately repeated in accordance with the number of unit cells 110 included in the battery pack 100.

Figure 8F:
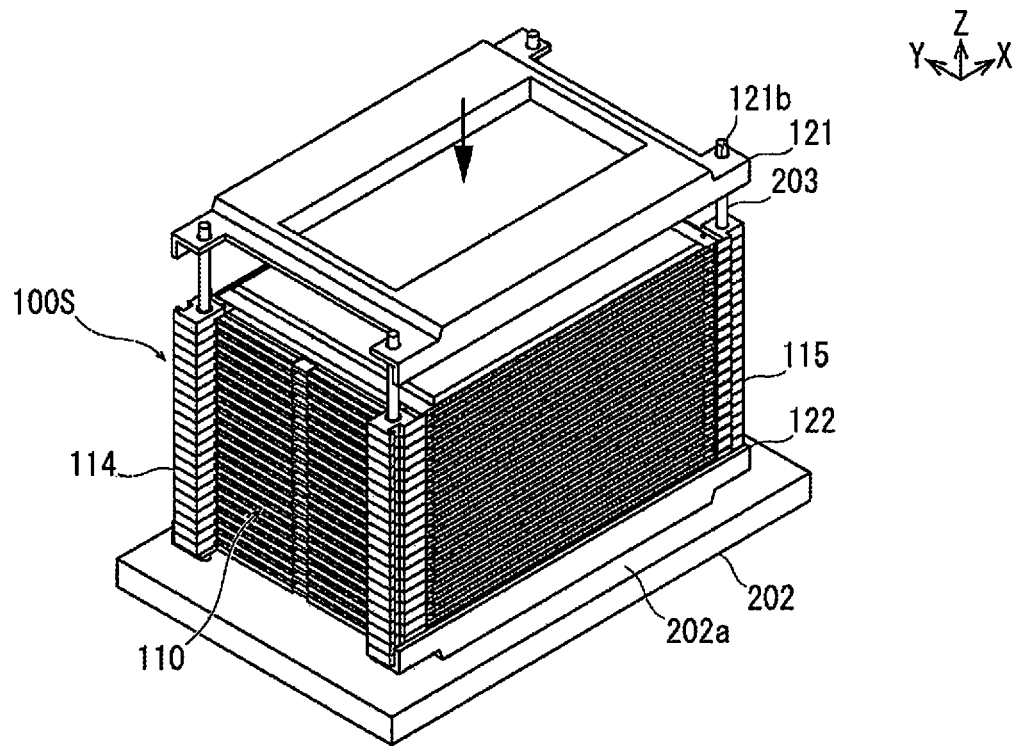
FIG. 8F, in continuation from FIG. 8E, is a perspective view schematically showing an upper pressurization plate being stacked on a stack (a plurality of unit cells stacked with elastic adhesives interposed therebetween)

The step shown in FIG. 8F corresponds to the stacking step S102. In continuation from FIG. 8E, FIG. 8F schematically shows the upper pressurization plate 121 in the process of being stacked on the stack 100S (the plurality of unit cells 110 stacked with the elastic adhesives 117 therebetween).

The locating holes 121b provided at the four corners of the upper pressurization plate 121 are slipped over the four locating braces 203 as shown in FIG. 8F. In this state, the upper pressurization plate 121 is stacked on the unit cell 110 positioned at the top of the stack 100S while the upper pressurization plate 121 is lowered along the stacking direction Z. The stack 100S (the plurality of unit cells 110 stacked with the elastic adhesives 117 therebetween) comes to be sandwiched by the upper pressurization plate 121 and the lower pressurization plate 122.

Figure 8G:
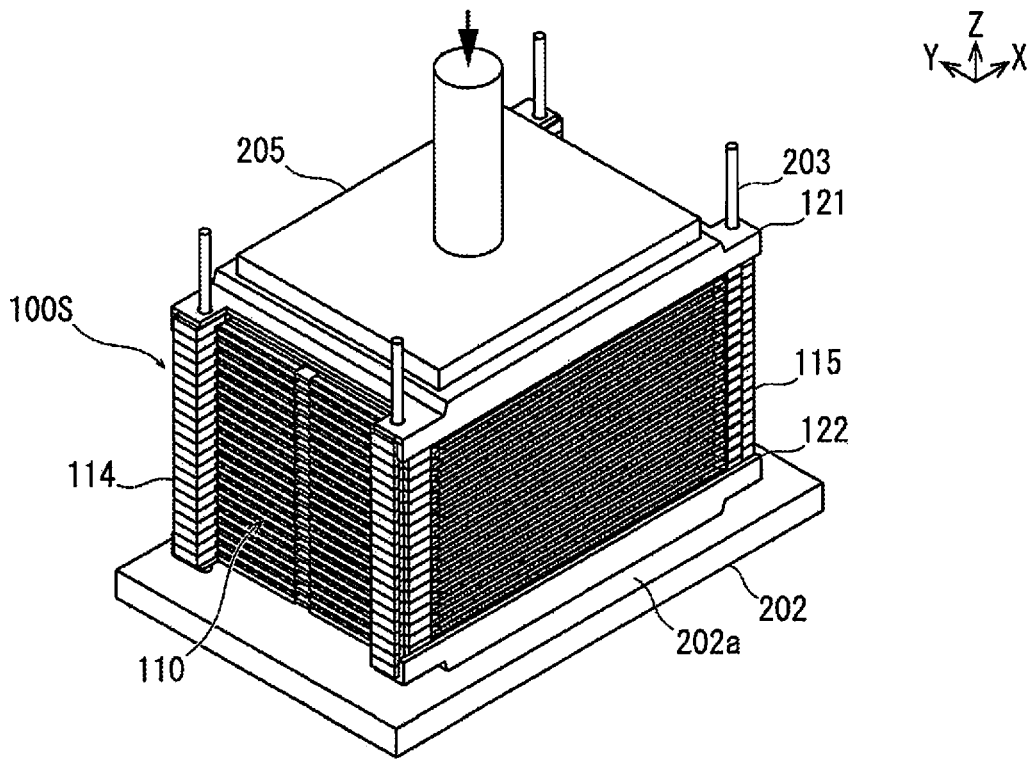
FIG. 8G, in continuation from FIG. 8F, is a perspective view schematically showing a state in which the stack (a plurality of unit cells stacked with elastic adhesives interposed therebetween), which is sandwiched between the upper pressurization plate and the lower pressurization plate, is pressurized by a press.

The step shown in FIG. 8G corresponds to the pressurization step S104. In continuation from FIG. 8F, FIG. 8G schematically shows a state in which the stack 100S (the plurality of unit cells 110 stacked with the elastic adhesives 117 therebetween) sandwiched between the upper pressurization plate 121 and the lower pressurization plate 122 is pressurized by a press 205.

The press 205 moves along the stacking direction Z by means of a linear-motion stage (not shown) or a hydraulic cylinder (not shown), as shown in FIG. 8G. When the press 205 moves downward along the stacking direction Z, the stack 100S sandwiched by the upper pressurization plate 121 and the lower pressurization plate 122 is pressurized, and sufficient surface pressure is applied to the power generation element 111 of each unit cell 110. As a result, each unit cell 110 can demonstrate expected electrical characteristics.

Figure 8H:
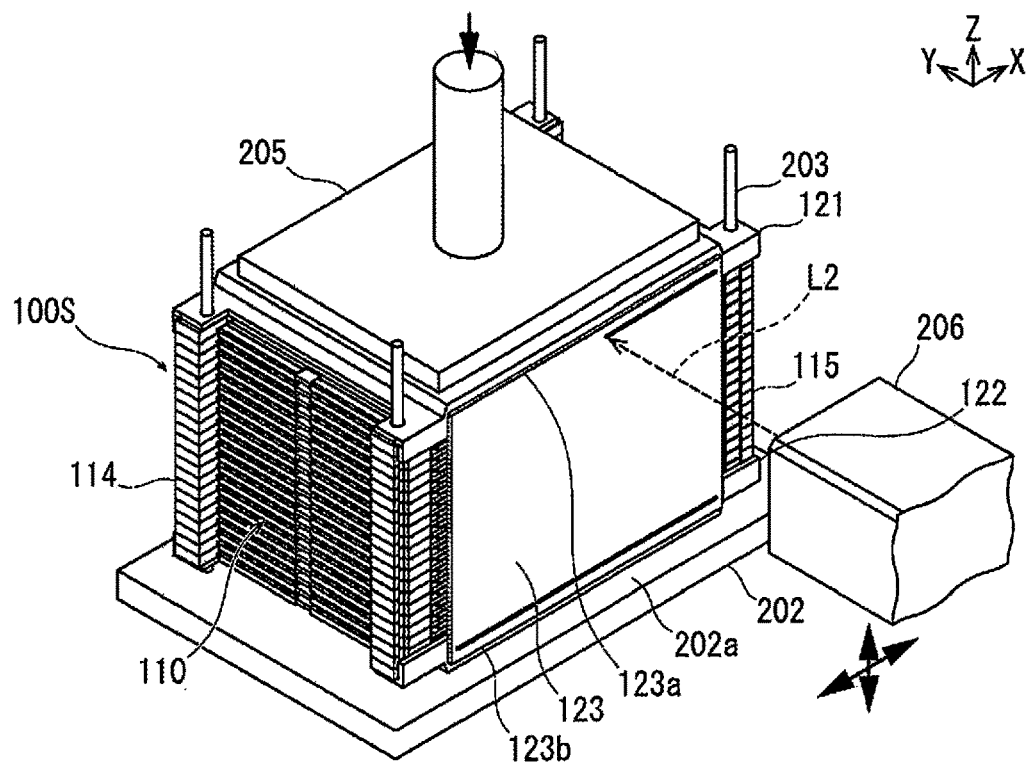
FIG. 8H, in continuation from FIG. 8G, is a perspective view schematically showing a state in which a side plate is laser-welded to the upper pressurization plate and the lower pressurization plate.

The step shown in FIG. 8H corresponds to the pressurization step S104. In continuation from FIG. 8G, FIG. 8H schematically shows the side plate 123 being laser-welded to the upper pressurization plate 121 and the lower pressurization plate 122.

The side plates 123 are laser welded by a laser light source 206 while in close contact with the upper pressurization plate 121 and the lower pressurization plate 122 with sufficient surface pressure applied to the power generation element 111 of each unit cell 110, as shown in FIG. 8H. The side plates 123 are pressed against the upper pressurization plate 121 and the lower pressurization plate 122 by means of a jig (not shown) provided with punch holes for laser irradiation. The laser light source 206 is configured from, e.g., an yttrium aluminum garnet (YAG) laser. A laser beam L2 emitted from the laser light source 206 is scanned diagonally along an upper end 123a and a lower end 123b of the side plates 123 to perform seam welding in a state in which the optical path is adjusted by an optical fiber or mirror and condensed by a condenser lens. The side plates 123 are provided as a pair so as to sandwich the upper pressurization plate 121 and the lower pressurization plate 122 from the left and right, and each are therefore laser welded. When the welding for one side plate 123 is completed, the placement stand 202 is rotated to cause the other side plate 123 and laser light source 206 to face each other to weld the other side plate 123. The pair of side plates 123 keep the upper pressurization plate 121 and the lower pressurization plate 122 at a constant spacing. Therefore, the surface pressure applied to the power generation element 111 of each unit cell 110 is maintained even when the press 205 is moved away from the upper pressurization plate 121.

Figure 8I:
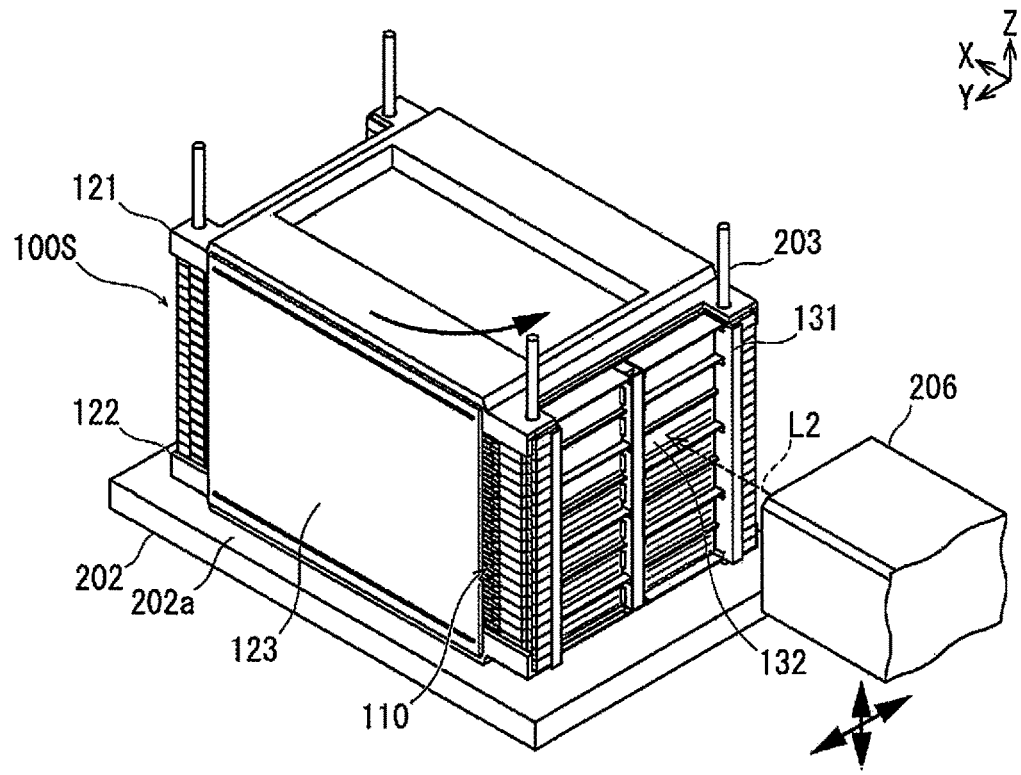
FIG. 8I, in continuation from FIG. 8H, is a perspective view schematically showing respective busbars, which corresponding to electrode tabs of each of the stacked unit cells, being brought into contact with and laser-welded to the electrode tabs.

The step shown in FIG. 8I corresponds to the electrical pathway connection step S105. In continuation from FIG. 8H, FIG. 8I schematically illustrates a state in which the busbars 132 are made to abut corresponding electrode tabs 112 of the stacked unit cells 110 and laser welding is performed.

The placement stand 202 is rotated 90° in the counterclockwise direction in the drawing from the state in FIG. 8H, and the electrode tabs 112 of the stacked unit cells 110 are made to face the laser light source 206, as shown in FIG. 8I. The busbar holder 131 is moved by a robot arm (not shown), and the busbars 132 integrally held by the busbar holder 131 are pressed against the corresponding electrode tabs 112 of the stacked unit cells 110. In the above-described state, the laser beam L2 is emitted from the laser light source 206, and the electrode tabs 112 of the corresponding busbars 132 are seam welded in sequence.

Figure 8J:
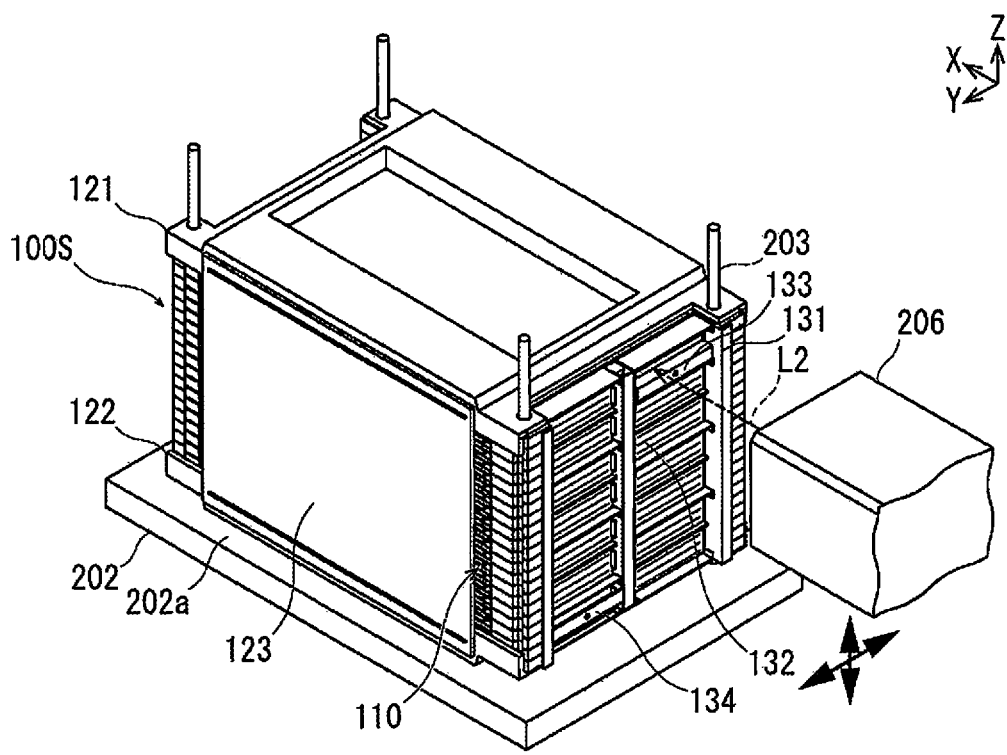
FIG. 8J, in continuation from FIG. 8I, is a perspective view schematically showing anode-side terminals being brought into contact with and laser-welded to anode-side busbars at an anode-side end, and cathode-side terminals being brought into contact with and laser-welded to cathode-side busbars at a cathode-side end.

The step shown in FIG. 8J corresponds to the electrical pathway connection step S105. In continuation from FIG. 8I, FIG. 8J schematically shows a partially completed state in which the anode-side terminal 133 is made to abut and be laser-welded to the anode-side busbars 132A at the anode-side end, and the cathode-side terminal 134 is made to abut and be laser-welded to the cathode-side busbars 132K at the cathode-side end.

Of the busbars 132 arranged in the form of a matrix, the anode-side terminal 133 is joined to the anode-side busbars 132A corresponding to the anode-side end and positioned in the upper right of the drawing, as shown in FIG. 8J. Similarly, of the busbars 132 arranged in the form of a matrix, the cathode-side terminal 134 is joined to the cathode-side busbars 132K corresponding to the cathode-side end and positioned in the lower left of the drawing.

Figure 8K:
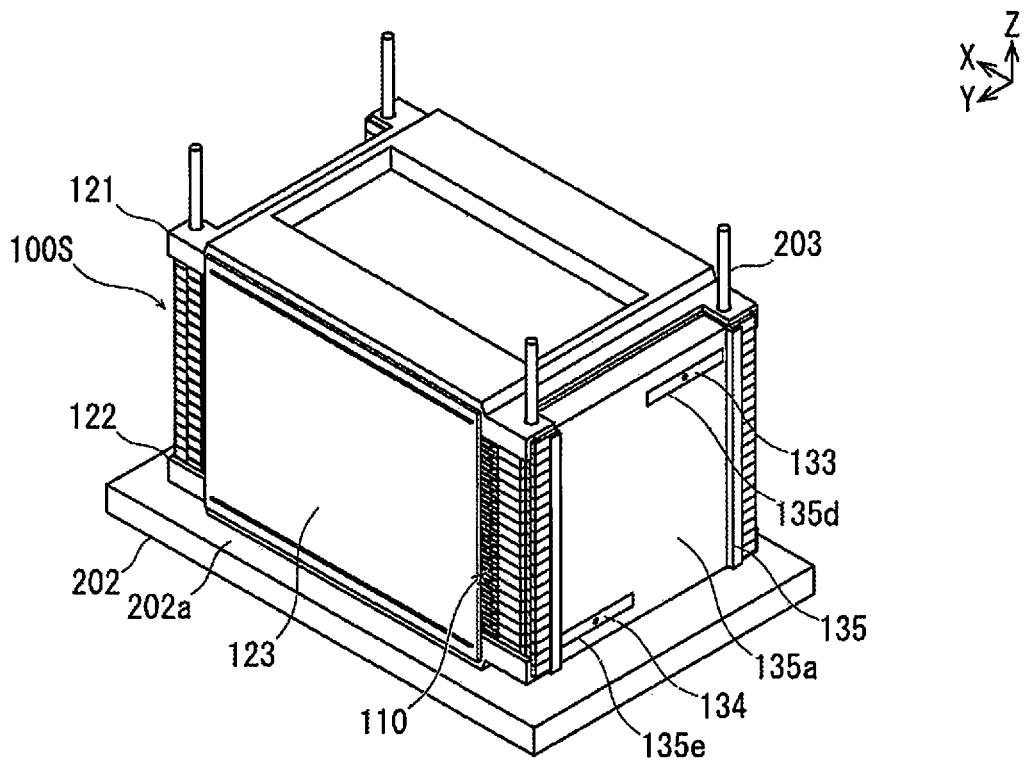
FIG. 8K, in continuation from FIG. 8J, is a perspective view schematically showing a state in which a plurality of busbars are covered by a single protective cover.

The step shown in FIG. 8K corresponds to the electrical pathway connection step S105. In continuation from FIG.

8J, FIG. 8K schematically shows a state in which the plurality of busbars 132 are covered by a single protective cover 135.

The protective cover 135 is moved by the robot arm (not shown), and one end 135b and another end 135c of the protective cover 135 are fitted into the busbar holder 131, as shown in FIG. 8K. The protective cover 135 is secured to the busbar holder 131 using a snap-fit-like hook, a screw, or an elastic adhesive. The protective cover 135 allows the anode-side terminal 133 to be exposed to the exterior through the first opening 135d provided to the side surface 135a, and allows the cathode-side terminal 134 to be exposed to the exterior through the second opening 135e provided to the side surface 135a. The protective cover 135 prevents the busbars 132 from making contact with an external member, etc., and short-circuiting or leaking current.

The method for producing the battery pack 100 described with reference to FIGS. 8A to 8K, etc., can be implemented in any mode; i.e., an automatic machine that controls all steps via a controller, a semiautomatic machine in which a worker has responsibility for some of the steps, or a manual machine in which a worker has responsibility for all the steps.

The actions and effects of the first embodiment described above will be described.

The method for producing the battery pack 100 is for producing the battery pack 100 in which a plurality of unit cells 110 are stacked with elastic adhesives 117 therebetween, and the stacked unit cells 110 are electrically connected. The method for producing the battery pack 100 has the measurement step S101 in which the thicknesses of unit cells 110 are measured, the arrangement step S103 in which a viscous elastic adhesive 117 is arranged between unit cells 110 adjacent in the stacking direction Z, and the pressurization step S104 in which the viscous elastic adhesive 117 arranged between the unit cells 110 is pressurized in the stacking direction Z via the unit cells 110 and the thickness of the elastic adhesive 117 in the stacking direction Z is reduced. In the method for producing the battery pack 100, based on the measured thickness of each of the unit cells 110 adjacent after stacking, the thickness of the elastic adhesive 117 in the stacking direction Z is controlled according to at least one of the following: the amount of elastic adhesive 117 arranged in the arrangement step S103; the length of time during which the elastic adhesive 117 is pressurized in the pressurization step S104; and the force by which the elastic adhesive 117 is pressurized in the pressurization step S104. The distance between the stacking-direction centers of two of the unit cells 110 adjacent in the stacking direction Z is kept within a constant range.

According to this method for producing the battery pack 100, the thickness of the elastic adhesive 117 is controlled according to at least one of the following: a pressurization time T of pressurization applied to the elastic adhesive 117; a pressurization force P of pressurization applied to the elastic adhesive 117; and a filling amount V of the elastic adhesive 117; and the stacking-direction Z height of the stack 100S of stacked unit cells 110 is kept within a constant range. In other words, there is no need to use a plurality of filling members of different thickness in accordance with the thickness of each of the unit cells 110 adjacent along the stacking direction Z. Therefore, according to the method for producing the battery pack 100, the stacking-direction Z height of the stack 100S of stacked unit cells 110 can be kept within a constant range even when there is variation in the thicknesses of the unit cells 110.

According to this method for producing the battery pack 100, the length of the entire battery pack 100 in the stacking direction Z can be set to a predetermined value by keeping the stacking-direction Z height of the stack 100S of stacked unit cells 110 within a constant range. Therefore, this method for producing the battery pack 100 is preferable for accommodating the battery pack 100 within a predetermined case, keeping the battery pack 100 in a predetermined space, etc.

The method for producing the battery pack 100 uses unit cells 110 provided with terminals (the electrode tabs 112) for inputting/outputting electric power, and busbars 132 for electrically connecting the electrode tabs 112 together. In the method for producing the battery pack 100, the terminals (the electrode tabs 112) and the busbars 132 are connected after the unit cells 110 are stacked.

According to the method for producing the battery pack 100, the distance between the stacking-direction centers of two of the unit cells 110 adjacent in the stacking direction Z is kept within a constant range, and it is therefore easy to keep the distances between electrode tabs 112 of unit cells 110 adjacent along the stacking direction Z within a constant range. Therefore, the electrode tabs 112 of the unit cells 110 and the busbars 132 can be easily joined after the unit cells 110 are stacked.

In the method for producing the battery pack 100, the filling amount V of the elastic adhesives 117 is constant, and based on the thickness H of each of the unit cells 110 adjacent after stacking, the length of time of pressurizing the elastic adhesives 117 arranged between unit cells 110 that are adjacent after stacking is controlled.

According to the method for producing the battery pack 100, the thickness of the elastic adhesives 117 provided between the unit cells 110 adjacent along the stacking direction Z is controlled by adjusting the pressurization time without increasing or reducing the filling amount V of the elastic adhesives 117, and the battery pack 100 can therefore be produced by an extremely simple configuration. In other words, according to the method for producing the battery pack 100, the stacking-direction Z height of the stack 100S of stacked unit cells 110 can be kept within a constant range even when there is variation in the thicknesses of the unit cells 110.

Particularly, according to this method for producing the battery pack 100, the method is preferable for cases in which the elastic adhesives 117 are sufficiently soft and there can be a correlation between the time during which pressurization is applied to the elastic adhesives 117 and the thickness of the elastic adhesives 117. Pressurization is applied to the elastic adhesives 117 by, for example, exerting a constant amount of pressure on the elastic adhesives 117 coated over the relatively lower positioned unit cells 110, this pressure being exerted by the weight of, inter alia, the relatively higher positioned unit cells 110 which are naturally falling. When a predetermined pressurization time is reached, the pressurization applied to the elastic adhesives 117 is ceased. When the movement of, inter alia, the relatively higher positioned unit cells 110 which are naturally falling is forcibly stopped, the pressurization applied to the elastic adhesives 117 can be ceased. To forcibly stop the movement of, inter alia, the naturally falling unit cells 110, for example, the collars 116 provided along the stacking direction Z are used in the first spacers 114 and the second spacers 115 supporting the unit cells 110. The collars 116 function as restricting members that regulate the intervals between stacked first spacers 114 and second spacers so that the intervals are constant.

In this method for producing the battery pack 100, the thickness H of the unit cells 110 is preferably measured before the filling members (the elastic adhesives 117) are arranged between unit cells 110 that are adjacent after stacking.

According to this method for producing the battery pack 100, the distances between the stacking-direction centers of two of the unit cells 110 adjacent in the stacking direction Z are kept within a constant range by controlling the thicknesses of the elastic adhesives 117 in the stacking direction Z based on the measured thickness of each of the unit cells 110 that are adjacent after stacking. Therefore, the positions of the unit cells 110 along the stacking direction Z are constantly measured so that the intervals between unit cells 110 adjacent along the stacking direction Z are constant, and control such as repeating the filling of the elastic adhesives 117 is unnecessary.

This method for producing the battery pack 100 is suitable for a configuration in which the electrode tabs 112 of which the distal end parts 112d are bent along the stacking direction Z and the busbars 132 electrically connecting the electrode tabs 112 of different unit cells 110 together are brought into contact and joined along the stacking direction Z.

According to this method for producing the battery pack 100, the distances between the electrode tabs 112 of unit cells 110 adjacent along the stacking direction Z can be kept within a constant range, and it is also possible to minimize the incline of the unit cells 110 relative to the stacking direction Z by having the elastic adhesives 117 follow the shape of the unit cells 110. Therefore, it is possible to prevent instances of contact between the busbars 132 and the distal end parts 112d of the electrode tabs 112 from being insufficient. In other words, with this method for producing the battery pack 100, the distal end parts 112d of the electrode tabs 112 and the busbars 132 can be sufficiently brought into contact and joined along the stacking direction Z even in cases of using electrode tabs 112 of which the distal end parts 112d are bent along the stacking direction Z.

This method for producing the battery pack 100 is suitable for a configuration in which at least spacers (the first spacers 114) supporting the electrode tabs 112 are stacked between the unit cells 110 adjacent along the stacking direction Z.

According to this method for producing the battery pack 100, the electrode tabs 112 are supported by the first spacers 114, and it is possible to prevent instances in which, as a result of variation in the thicknesses of the unit cells 110, the electrode tabs 112 interfere with the first spacers 114 and buckle or curve. The electrode tabs 112 interfere with the first spacers 114 and readily deform particularly in cases such as when the electrode tabs 112 become bent along the stacking direction Z, but such interference can be prevented by keeping the intervals between the electrode tabs 112 of unit cells 110 adjacent along the stacking direction Z within a constant range. Therefore, the battery pack 100 can be configured using the first spacers 114 supporting the electrode tabs 112.

This method for producing the battery pack 100 is suitable for a configuration that uses spacers (pairs of spacers composed of first spacers 114 and second spacers 115) provided with regulating members (collars 116) that regulate thickness along the stacking direction Z.

According to this method for producing the battery pack 100, the collars 116 each function as a stopper that regulates and stops the position of one unit cell 110 that is naturally falling toward another unit cell 110. In other words, intervals in the positions of the collars 116 of the unit cells 110A adjacent along the stacking direction Z can be strictly regulated. Furthermore, when excessive force occurs, the collars 116 can absorb the pressure thereof.

This method for producing the battery pack 100 is suitable for a configuration in which, between unit cells 110 adjacent along the stacking direction Z, the elastic adhesive 117 is arranged in an area that overlaps, along the stacking direction Z, the power generation element 111 provided to each of the unit cells 110.

According to this method for producing the battery pack 100, sufficient surface pressure can be exerted on the power generation element 111 of each of the unit cells 110. As a result, each of the unit cells 110 can demonstrate expected electrical characteristics.

This method for producing the battery pack 100 is suitable for a configuration that uses filling members including elastic adhesives 117 having elastic force after curing.

According to this method for producing the battery pack 100, the elastic adhesives 117 can absorb pressure fluctuations by following expansion and contraction of the unit cells 110 along the stacking direction Z and changing in thickness.

This method for producing the battery pack 100 is suitable for a configuration that uses unit cells 110 provided with covering members (laminate films 113) that insulate and cover the power generation elements 111.

According to this method for producing the battery pack 100, the elastic adhesives 117 can absorb stress exerted on the laminate films 113 of the unit cells 110 and protect the laminate films 113 when the unit cells 110 vibrate or impact is exerted on the unit cells 110.

Second Embodiment

Figure 12:
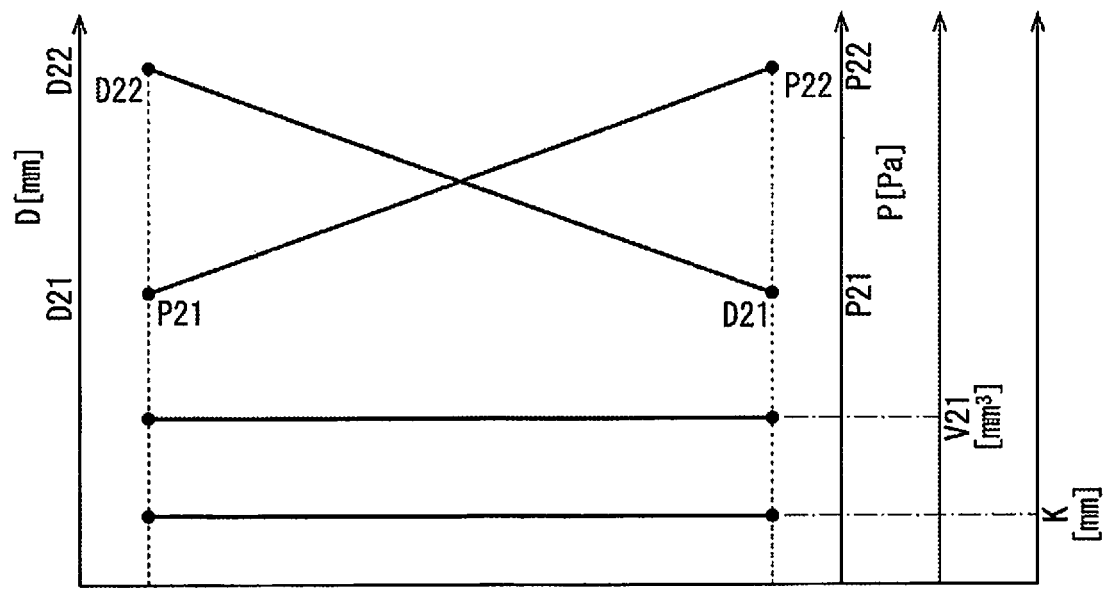
FIG. 12 is a chart showing, inter alia, a relationship between a gap in unit cells vertically adjacent along the stacking direction and pressurization force by which elastic adhesives are pressurized via unit cells, in a method for producing a battery pack according to a second embodiment.
Figure 13A:
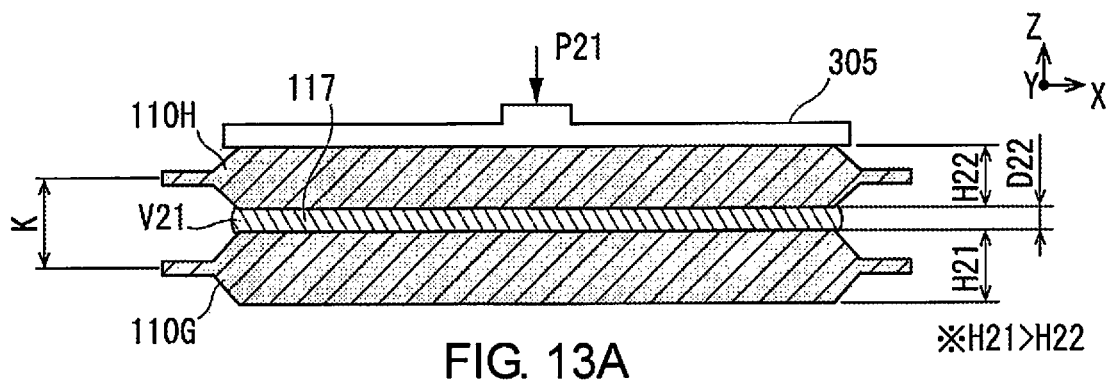
FIG. 13A is a side view in which an example of unit cells stacked with elastic adhesives interposed therebetween is shown in cross-section based on conditions shown in FIG. 12.
Figure 13B:
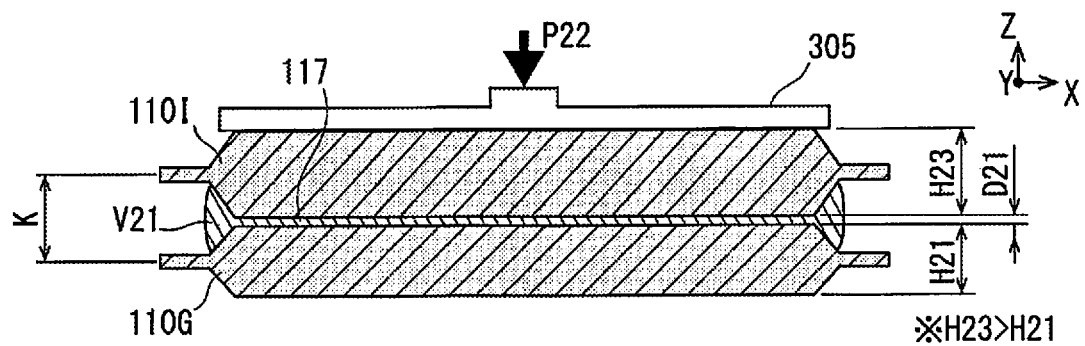
FIG. 13B is a side view in which another example of unit cells stacked with elastic adhesives interposed therebetween is shown in cross-section based on conditions shown in FIG. 12.

FIG. 12 shows, inter alia, a relationship between the gaps between unit cells 110 vertically adjacent along the stacking direction Z and pressurization force applied to the elastic adhesives 117 via the unit cells 110 in the method for producing the battery pack 100 according to a second embodiment. FIG. 13A schematically shows, in cross-section, an example in which unit cells 110 are stacked with elastic adhesives 117 therebetween, based on conditions shown in FIG. 12. FIG. 13B schematically shows, in cross-section, another example in which unit cells 110 are stacked with elastic adhesives 117 therebetween, based on the conditions shown in FIG. 12.

The method for producing the battery pack 100 of the second embodiment differs from the method for producing the battery pack 100 of the previously described first embodiment in that the magnitudes of force by which the elastic adhesives 117 are pressurized are different. In the previously described first embodiment, the pressurization times during which the elastic adhesives 117 are pressurized are different.

The stacking-direction Z intervals K between the plurality of unit cells 110 stacked with the elastic adhesives 117 therebetween are the same, as shown in FIGS. 12, 13A, and 13B.

As shown in FIG. 13A, with the thickness of a unit cell 110G positioned relatively lower denoted as H21 and the thickness of a unit cell 110H positioned relatively higher denoted as H22, for example, H21>H22. The filling amount V of the elastic adhesive 117 coated over the unit cell 110G is denoted as V21. Pressurization at a pressurization force P21 is applied by a press 305 from the unit cell 110H toward the unit cell 110G, so that an interval between the unit cell 110G and the unit cell 110H is K. As a result, the elastic adhesive 117 between the unit cell 110G and the unit cell 110H is pushed horizontally outward (in the long-axis direction X and the short-axis direction Y), and a gap between the unit cell 110G and the unit cell 110H is D22.

As shown in FIG. 13B, with the thickness of a unit cell 110I positioned relatively higher than the unit cell 110H denoted as H23, for example, H23>H21. The filling amount V of the elastic adhesive 117 coated over the unit cell 110G is V21, the same as that shown in FIG. 13A. Pressurization at a pressurization force P22 (>P21) is applied by the press 305 from the unit cell 110I toward the unit cell 110G, so that an interval between the unit cell 110G and the unit cell 110I is K. As a result, the elastic adhesive 117 between the unit cell 110G and the unit cell 110I is pushed horizontally outward (in the long-axis direction X and the short-axis direction Y), and a gap between the unit cell 110G and the unit cell 110H is D21 (<D22).

The pressurization force (P22>P21) applied to the elastic adhesives 117 via the unit cells 110 differs depending on the size of the gap (D22>D21) between unit cells 110 vertically adjacent after stacking. As the gaps between unit cells 110 vertically adjacent after stacking become larger, the percentage by which the elastic adhesives 117 are pushed horizontally outward (in the long-axis direction X and the short-axis direction Y) by the unit cells 110 decreases, and the pressurization force of the unit cells 110 decreases. For example, the pressurization force P21 when the gap between the unit cells 110 shown in FIG. 13A is D22 (>D21) is less than the pressurization force P22 when the gap between the unit cells 110 shown in FIG. 13B is D21.

The actions and effects of the second embodiment described above will be described.

In this method for producing the battery pack 100, the filling amounts V of the filling members (elastic adhesives 117) are kept constant, and the magnitude of force pressurizing the elastic adhesives 117 arranged between the unit cells 110 adjacent after stacking is controlled based on the thickness H of each of the unit cells 110 adjacent after stacking.

According to this method for producing the battery pack 100, the battery pack 100 can be produced by an extremely simple configuration because the thicknesses of the elastic adhesives 117 provided between unit cells 110 adjacent along the stacking direction Z are controlled by adjusting the magnitude of force pressurizing the elastic adhesives 117 without increasing or decreasing the filling amounts V of the elastic adhesives 117. In other words, according to the method for producing the battery pack 100, the stacking-direction Z height of the stack 100S of stacked unit cells 110 can be kept within a constant range even when there is variation in the thicknesses of the unit cells 110.

This method for producing the battery pack 100 is particularly preferable in cases in which the elastic adhesives 117 are sufficiently hard and there can be a correlation between the magnitude of force pressurizing the elastic adhesives 117 and the thicknesses of the elastic adhesives 117.

Third Embodiment

Figure 14:
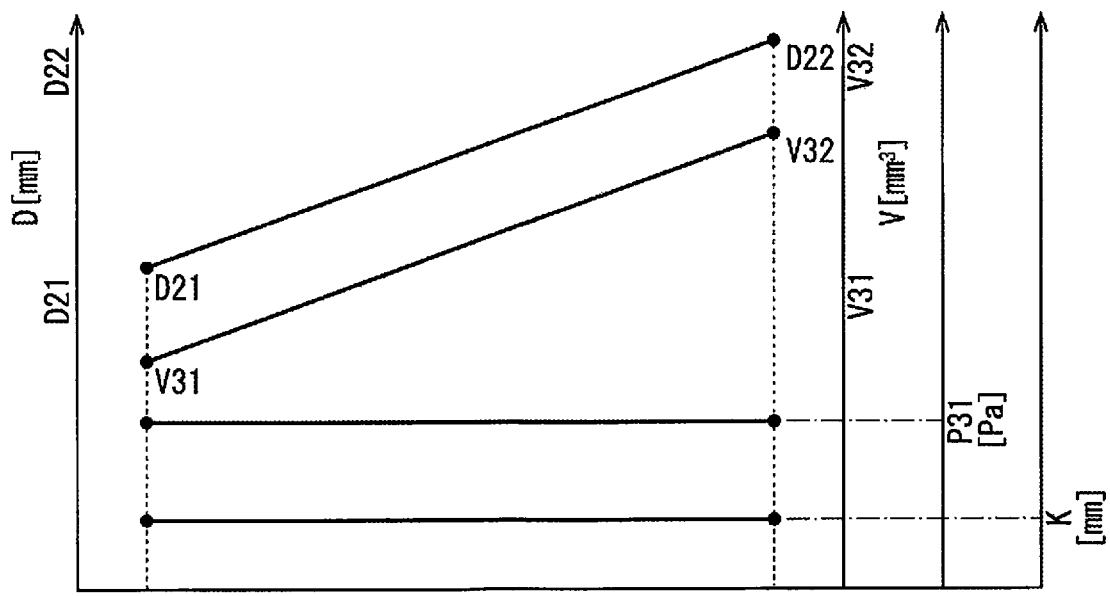
FIG. 14 is a chart showing, inter alia, a relationship between a gap in unit cells vertically adjacent along the stacking direction and an amount of an elastic adhesive coated over a unit cell, in a method for producing a battery pack according to a third embodiment.
Figure 15A:
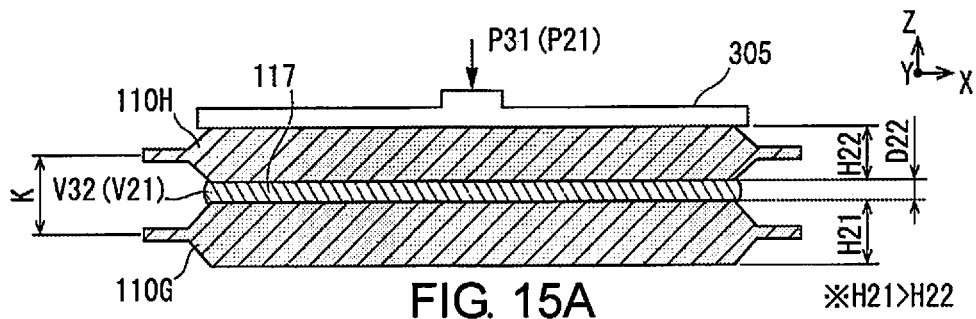
FIG. 15A is a side view in which an example of unit cells stacked with elastic adhesives interposed therebetween is shown in cross-section based on conditions shown in FIG. 14.
Figure 15B:
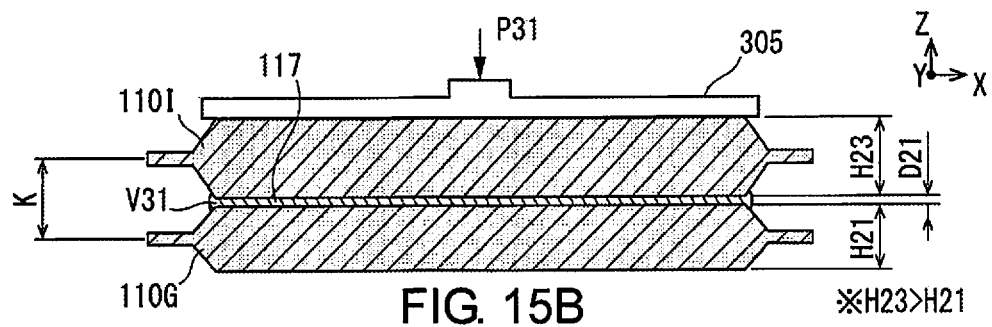
FIG. 15B is a side view in which another example of unit cells stacked with elastic adhesives interposed therebetween is shown in cross-section based on conditions shown in FIG. 14.

FIG. 14 shows, inter alia, a relationship between the gaps between unit cells 110 vertically adjacent along the stacking direction Z and the filling amount V of the elastic adhesives 117 coated over the unit cells 110 in the method for producing the battery pack 100 according to a third embodiment. FIG. 15A schematically shows, in cross-section, an example in which unit cells 110 are stacked with elastic adhesives 117 therebetween, based on conditions shown in FIG. 14. FIG. 15B schematically shows, in cross-section, another example in which unit cells 110 are stacked with elastic adhesives 117 therebetween, based on the conditions shown in FIG. 14.

The method for producing the battery pack 100 of the third embodiment differs from the methods for producing the battery pack 100 of the previously described first embodiment and second embodiment in that there are different filling amounts V with which the elastic adhesives 117 are filled on the unit cells 110. In the previously described first embodiment, the pressurization times during which the elastic adhesives 117 are pressurized are different. In the previously described second embodiment, the magnitudes of force pressurizing the elastic adhesives 117 are different.

The stacking-direction Z intervals K between the plurality of unit cells 110 stacked with the elastic adhesives 117 therebetween are the same, as shown in FIGS. 14, 15A, and 15B.

Configurations of two of the unit cells 110 shown in FIGS. 15A and 15B are the same as the configurations of two of the unit cells 110 shown in FIGS. 13A and 13B. The gaps between two of the unit cells 110 shown in FIGS. 15A and 15B are the same as the gaps between two of the unit cells 110 shown in FIGS. 13A and 13B.

The filling amount (V32>V31) of an elastic adhesive 117 coated over a unit cell 110 differs depending on the size of the gap (D22>D21) between unit cells 110 vertically adjacent after stacking, as shown in FIG. 14. As the gaps between unit cells 110 vertically adjacent after stacking become larger, the filling amounts V of the elastic adhesives 117 are increased in proportion to volume corresponding to the gaps. For example, a filling amount V32 of an elastic adhesive 117 when the gap between two of the unit cells 110 shown in FIG. 15A is D22 (>D21) is greater than a filling amount V31 of an elastic adhesive 117 when the gap between two of the unit cells 110 shown in FIG. 15B is D21. Pressurization force P31 by which the relatively higher positioned unit cell 110 is pressurized by the press 305 is constant, as shown in FIGS. 15A and 15B.

The actions and effects of the third embodiment described above will be described.

In this method for producing the battery pack 100, the magnitude of force pressurizing the filling members (elastic adhesives 117) is constant, and the filling amounts V of elastic adhesives 117 arranged between unit cells 110 adjacent after stacking are controlled based on the thicknesses H of each of the unit cells 110 adjacent after stacking.

According to this method for producing the battery pack 100, the battery pack 100 can be produced by an extremely simple configuration because the thicknesses of the elastic adhesives 117 provided between unit cells 110 adjacent along the stacking direction Z are controlled by adjusting the filling amounts V of the elastic adhesives 117, without increasing or reducing the magnitude of force pressurizing the elastic adhesives 117. In other words, according to this method for producing the battery pack 100, the stacking-direction Z height of the stack 100S of stacked unit cells 110 can be kept within a constant range even when there is variation in the thicknesses of the unit cells 110.

This method for producing the battery pack 100 is particularly preferable in cases in which the elastic adhesives 117 are sufficiently hard and there can be a correlation between the filling amounts V of the elastic adhesives 117 and the thicknesses of the elastic adhesives 117.

Fourth Embodiment

Figure 18A:
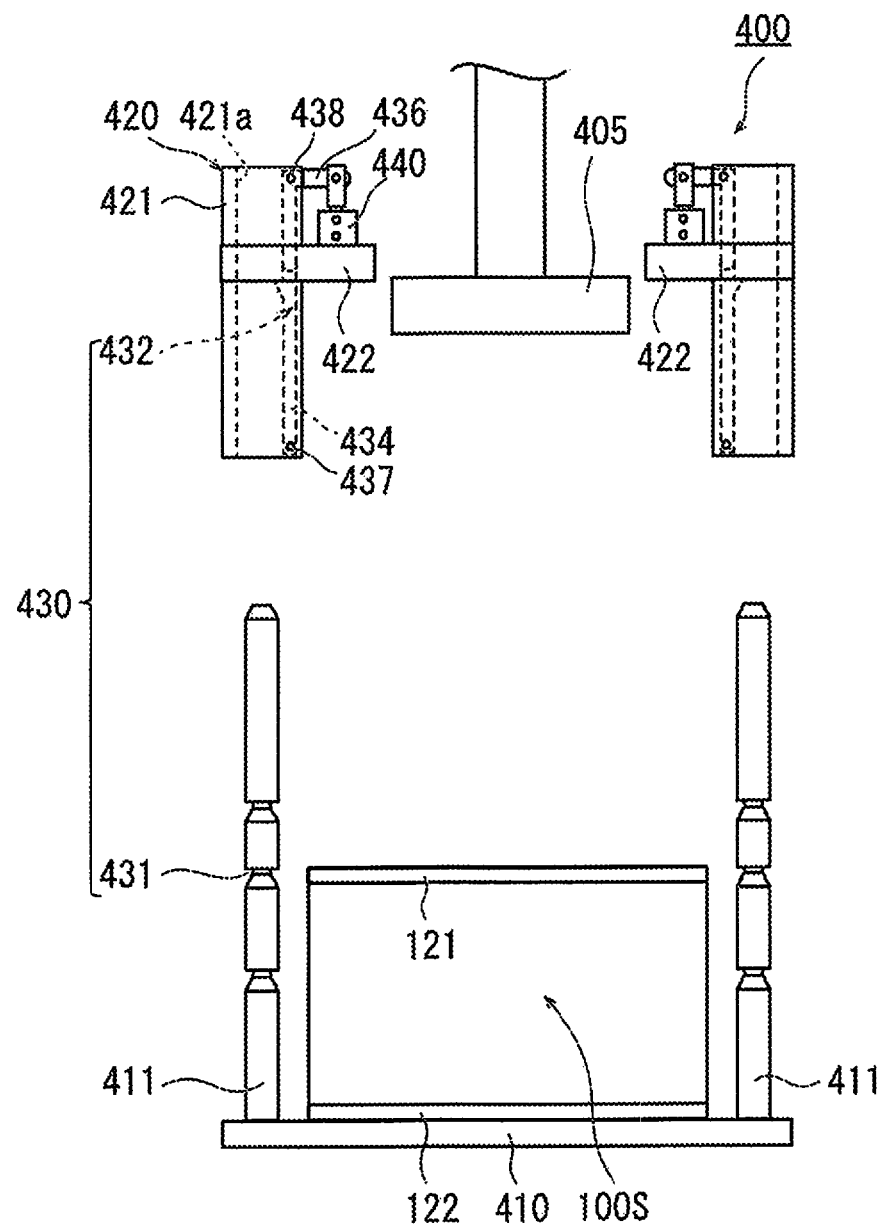
FIG. 18A schematically shows a state in which a pushing part of a stacking jig is raised to a standby position and a stack is formed.
Figure 18B:
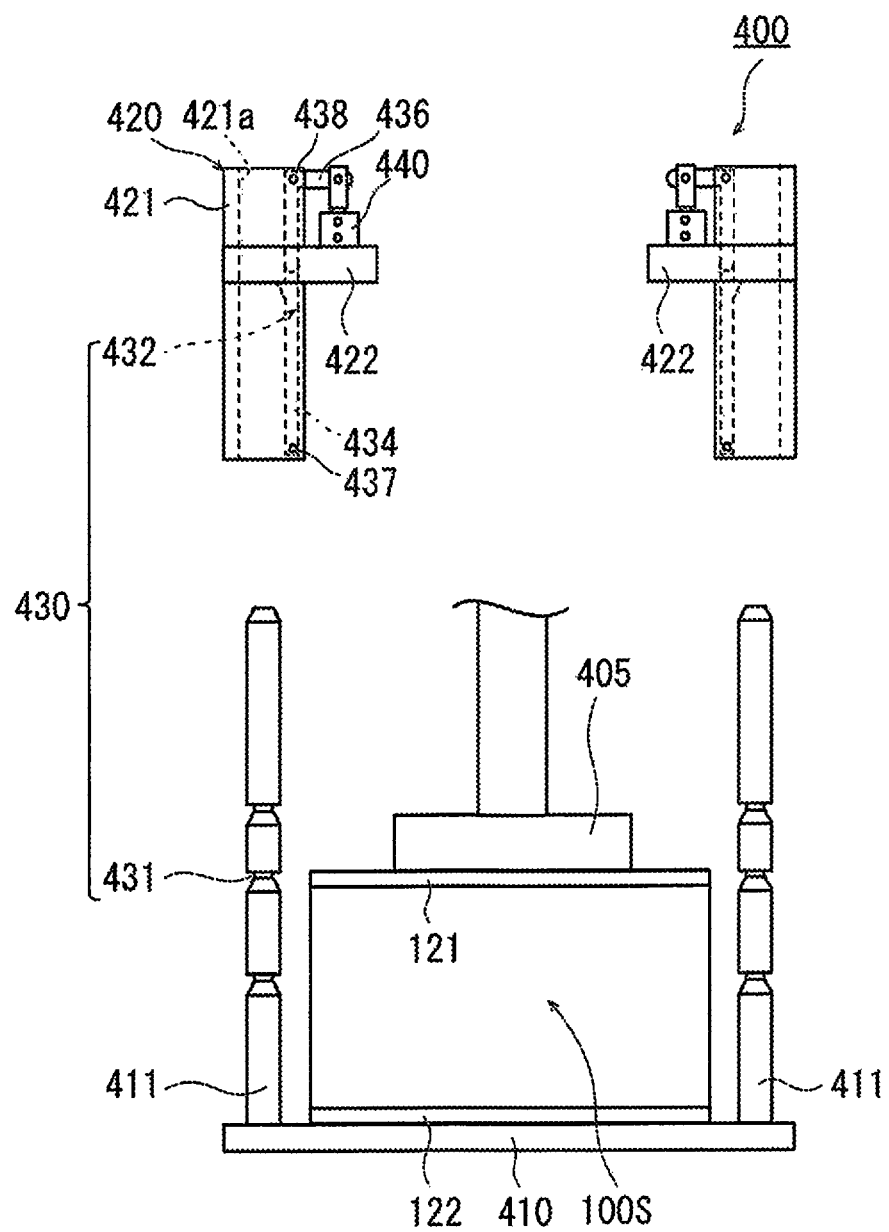
FIG. 18B, in continuation from FIG. 18A, schematically shows a state in which the stack is pressurized by the press.
Figure 18C:
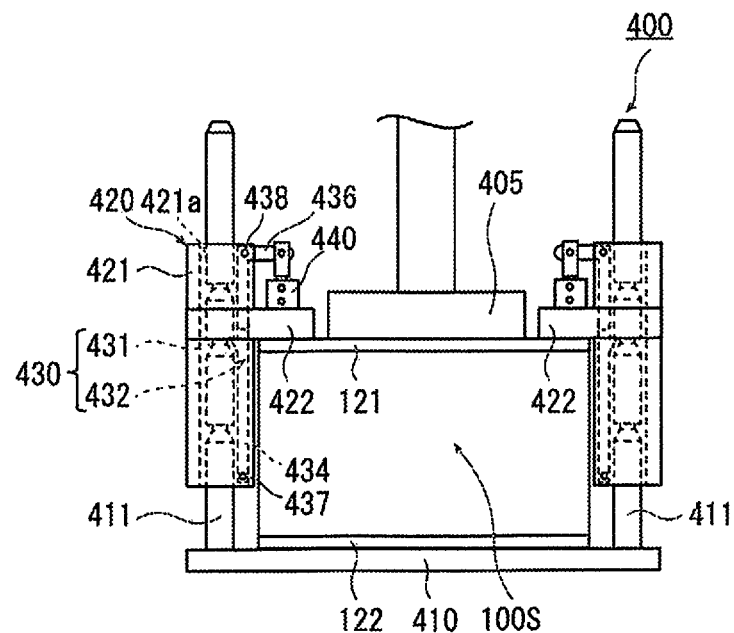
FIG. 18C, in continuation from FIG. 18B, schematically shows a state in which the pushing part of the stacking jig pushes on the stack, and a stacking-direction position of the pushing part is secured in a pre-established position.
Figure 18D:
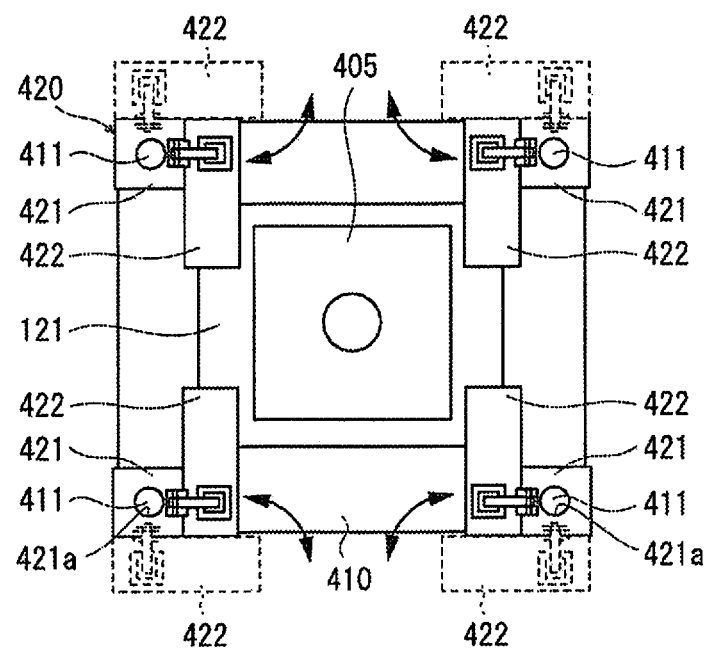
FIG. 18D is a plan view of the stacking jig in the state of FIG. 18C.
Figure 18E:
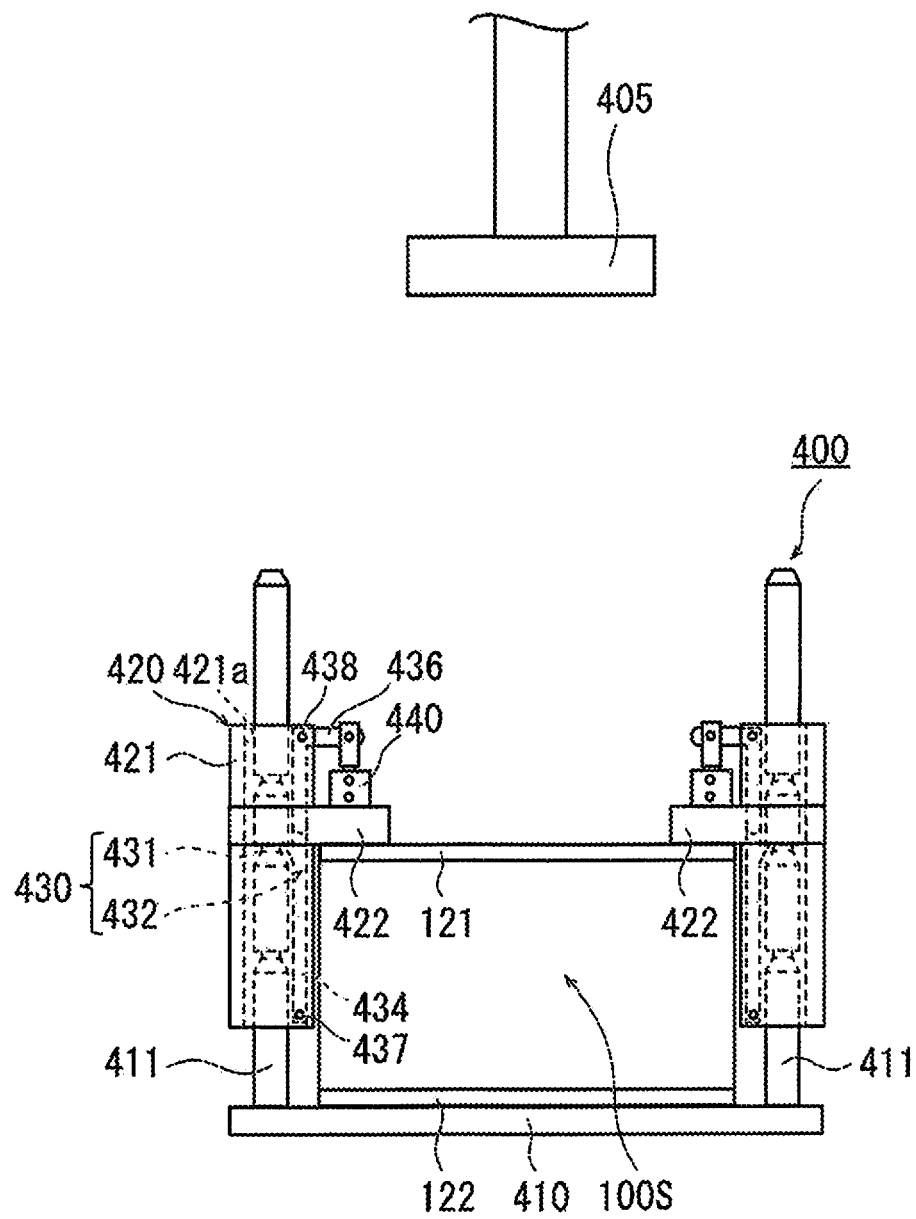
FIG. 18E, in continuation from FIG. 18C, schematically shows a state in which the press is raised and pressurization in the stacking direction is released.
Figure 19A:
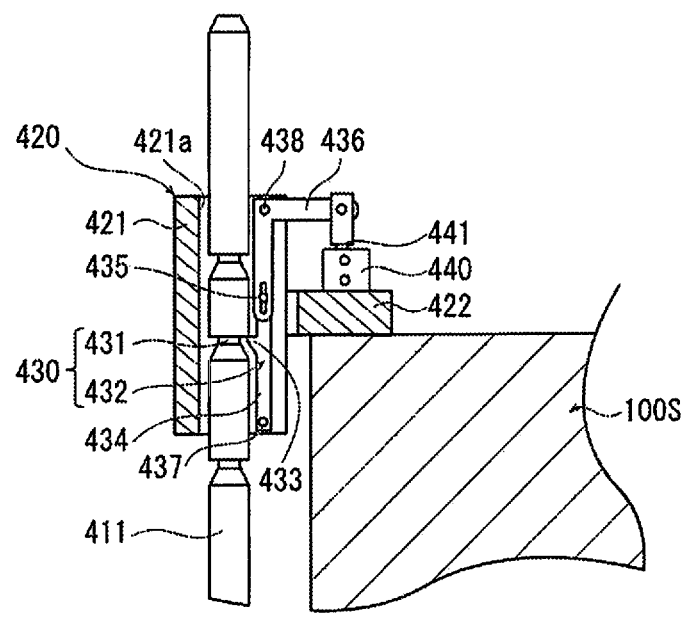
FIG. 19A is a cross-sectional view of a securing part of the stacking jig, also showing a state in which an interlocking pawl of a ratchet mechanism has engaged in a lock groove of a stopper pin.
Figure 19B:
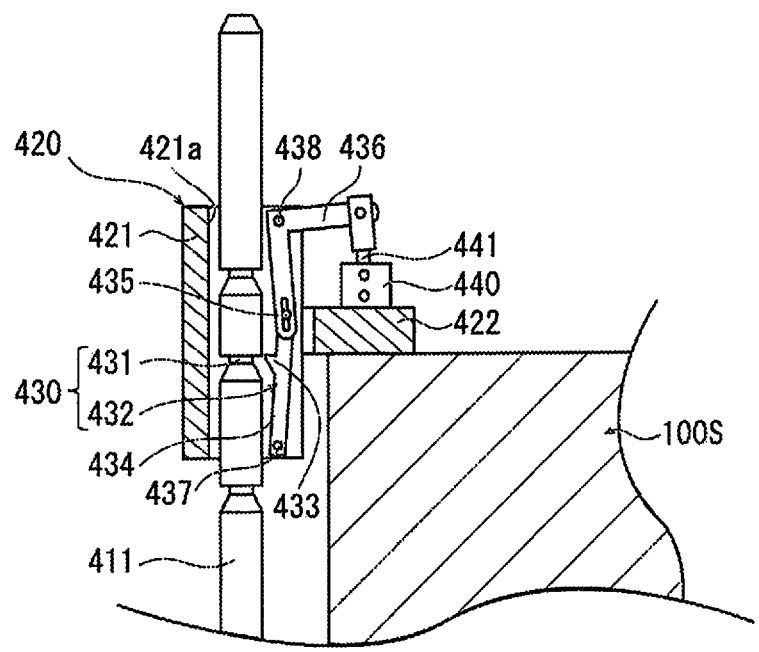
FIG. 19B is a cross-sectional view of the securing part of the stacking jig, also showing a state in which the interlocking claw of the ratchet mechanism has disengaged from the lock groove of the stopper pin.

FIG. 18A schematically shows a state in which a pushing part 420 of a stacking jig 400 has been raised to a standby position and the stack 100S has been formed. In continuation from FIG. 18A, FIG. 18B schematically shows the stack 100S being pressurized by a press 405. In continuation from FIG. 18B, FIG. 18C schematically shows a state in which the pushing part 420 of the stacking jig 400 pushes on the stack 100S, and a stacking-direction Z position of the pushing part 420 is secured in a pre-established position. FIG. 18D is a plan view of the stacking jig 400 in the state of FIG. 18C. In continuation from FIG. 18C, FIG. 18E schematically shows a state in which the press 405 has been raised and the pressurization in the stacking direction Z has been released. FIGS. 19A and 19B are cross-sectional views showing a securing part 430 of the stacking jig 400; FIG. 19A shows a state in which a locking claw 433 of a ratchet mechanism 432 has engaged with a lock groove 431 of a stopper pin 411, and FIG. 19B shows a state in which the locking claw 433 of the ratchet mechanism 432 has disengaged from the lock groove 431 of the stopper pin 411.

In the first embodiment, with the stack 100S of stacked unit cells 110 pressurized in the stacking direction Z by the press 205 as shown in FIG. 8H, the side plates 123 are laser welded by the laser light source 206 to the upper pressurization plate 121 and the lower pressurization plate 122. In other words, pressurization on the stack 100S and weld-joining are performed in one machining stage. Depending on the layout of the press 205, the laser light source 206, and other equipment, the pressurization process on the stack 100S and the welding process are sometimes performed in separate machining stages. In such cases, when the stack 100S is transported from a machining stage for the machining process to a machining stage for the welding process, the pressurization in the stacking direction Z using the press 205 is released. Therefore, the stack 100S must be transported while under pressurization to the machining stage for the welding process.

The method for producing the battery pack 100 of the fourth embodiment can be suitably applied to such cases. In the machining step of this method for producing the battery pack 100, the stack 100S of stacked unit cells 110 is pushed by the pushing part 420 which can move in the stacking direction Z, the stacking-direction Z position of the pushing part 420 is secured in a pre-established position, and the pressurization in the stacking direction Z is then released. Devices for implementing this production method are described below.

The stacking jig 400 used in the machining step has a base plate 410 on which the lower pressurization plate 122 is positioned and placed, and a plurality of stopper pins 411 attached on top of the base plate 410, as shown in FIGS. 18A to 18E. The lower pressurization plate 122 is positioned on top of the base plate 410 using positioning pins, etc. The stopper pins 411 extend along the stacking direction Z. The stacking jig 400 further has a plurality of pushing parts 420 that push on the stack 100S, and the securing parts 430 which secure the positions of each of the pushing parts 420. The pushing parts 420 are provided so as to be able to move in the stacking direction Z. In the illustrated example, four stopper pins 411 and four pushing parts 420 are provided so as to push on the four corners of the stack 100S. The securing parts 430 secure the positions of the pushing parts 420 in the stacking direction Z at pre-established positions. The term "pre-established positions" means set to positions whereby the stacking-direction Z height of the stack 100S of stacked unit cells 110 is kept within a constant range.

The pushing parts 420 each have a guide block 421 having formed therein an insertion hole 421a slipped over a stopper pin 411, and a pushing block 422 that is provided to the guide block 421 and that comes into contact with an upper surface of the stack 100S, as shown in FIGS. 19A and 19B. Engaging grooves (not shown) are formed in a spiral formation in outer peripheral surfaces of the stopper pins 411, and protrusions (not shown) that fit with the engaging grooves are formed in inner peripheral surfaces of the insertion holes 421a.

When the guide blocks 421 are slipped over the stopper pins 411 and lowered, the guide blocks 421 rotate due to being guided along the protruding spiral-form engaging grooves. As the guide blocks 421 descend and rotate, the pushing blocks 422 rotate from positions of not interfering with the stack 100S (the positions shown by dashed lines in FIG. 18D) to positions of being able to come into contact with the upper surface of the stack 100S (the positions shown by solid lines in FIG. 18D).

When the guide blocks 421 are raised from this state along the stopper pins 411, as the guide blocks 421 rise and rotate, the pushing blocks 422 rotate from the positions of being able to come into contact with the upper surface of the stack 100S to the positions of not interfering with the stack 100S.

When placement of the unit cells 110 and arrangement of the elastic adhesives 117 are being performed repeatedly, the pushing parts 420 wait in positions above the stopper pins 411 and in positions of not interfering with the press 405. The pushing parts 420 are driven by a robot hand, etc., to rise and descend in the stacking direction Z between the standby positions and the stopper pins 411.

The securing parts 430 each have a lock groove 431 formed in a stopper pin 411, and a ratchet mechanism 432 provided to the pushing part 420 and able to engage with the lock groove 431. Because the elastic adhesives 117 are viscoelastic bodies even after curing, the lock grooves 431 and the ratchet mechanisms 432 have shapes and structures such that these components are able to push on the stack 100S against reaction force of the elastic adhesives 117.

The lock grooves 431 are formed to have minor diameters smaller than outside diameters of the stopper pins 411. Flat interlocking surfaces with which the locking claws 433 of the ratchet mechanisms 432 come into contact are formed in upper sides within the lock grooves 431.

The ratchet mechanisms 432 each have a first arm part 434 provided with the locking claw 433, and a second arm part 436 connected to the first arm part 434 via a linking pin 435. The first arm part 434 is turnably attached to a guide block 421 by a support pin 437, and the second arm part 436 is turnably attached to the guide block 421 by a support pin 438. An upper surface of the locking claw 433 is formed to be flat. The ratchet mechanism 432 is provided with a spring member (not shown) that imparts resilient force to the first arm part 434 and the second arm part 436. The resilient force of the spring member acts in a direction whereby the locking claw 433 is caused to engage with the lock groove 431 (see FIG. 19A). The ratchet mechanism 432 is provided with an actuator 440 that disengages the locking claw 433 from the lock groove 431 against the resilient force of the spring member. The actuator 440 is attached to the top of the pushing block 422. A distal end of an actuating rod 441 of the actuator 440 is linked to an end part of the second arm part 436. The actuator 440 is configured from, for example, a fluid pressure cylinder actuated by fluid pressure of compressed air, etc.

When fluid pressure is supplied to the actuator 440 and the actuating rod 441 moves to a forward limit position, the second arm part 436 rotates counterclockwise about the support pin 438. As the second arm part 436 rotates, the first arm part 434 linked by a pin rotates clockwise about the support pin 437. As the first arm part 434 rotates, the locking claw 433 disengages from the lock groove 431 (see FIG. 19B). The position of the pushing part 420 thereby ceases to be secured by the securing part 430.

The lock grooves 431 are formed in the stopper pins 411 at different positions (three locations in the illustrated example) in the stacking direction Z. The pushing parts 420 can be secured in different positions in the stacking direction Z by the ratchet mechanisms 432, and one stacking jig 400 can be applied to the production of a wide variety of battery packs in which the heights of the stacks 100S are different.

A battery pack is produced using the stacking jig 400 in the following manner.

The pushing parts 420 of the stacking jig 400 are raised to the standby positions and the lower pressurization plate 122 is positioned and placed on top of the base plate 410, as shown in FIG. 18A. A unit cell 110 is placed on top of the lower pressurization plate 122, and an elastic adhesive 117 is arranged on top of the unit cell 110. Placement of unit cells 110 and arrangement of elastic adhesives 117 are performed repeatedly, and a stack 100S of stacked predetermined number of unit cells 110 is formed. The upper pressurization plate 121 is stacked on top of the stack 100S.

The stack 100S (a plurality of stacked unit cells 110 with elastic adhesives 117 interposed therebetween) sandwiched by the upper pressurization plate 121 and the lower pressurization plate 122 is pressurized by the press 405, as shown in FIG. 18B.

The pushing parts 420 are lowered from the standby positions, and the guide blocks 421 of the pushing parts 420 are slipped over the stopper pins 411 and lowered, as shown in FIGS. 18C and 18D. When the guide blocks 421 are lowered to predetermined positions, the pushing blocks 422 of the pushing parts 420 rotate from positions of not interfering with the stack 100S to positions of being able to come into contact with the upper surface of the stack 100S.

The locking claws 433 of the ratchet mechanisms 432 are subjected to the resilient force of the spring members, and the claws engage with the lock grooves 431, as shown in FIG. 19A. The pushing parts 420, which are able to move in the stacking direction Z, thereby push on the stack 100S, and the positions of the pushing parts in the stacking direction Z are secured in the pre-established positions.

The press 405 is then raised and the pressurization in the stacking direction Z is released, as shown in FIG. 18E.

Even when the pressurization by the press 405 is released, the stack 100S is pushed by the pushing parts 420, and the elastic adhesives 117 are pushed outward to the regulated thickness. At the same time, any lifting of the stack 100S by the reactive force of the elastic adhesives 117 can be minimized, and the height of the stack 100S along the stacking direction Z can be maintained within a constant range.

The stacking jig 400 pressurizing the stack 100S is transported from the pressurization stage for the pressurization process to the pressurization stage for the welding process. In the pressurization stage for the welding process, the pair of side plates 123 are laser welded by the laser light source 206 while in close contact with the upper pressurization plate 121 and the lower pressurization plate 122.

When the electrical pathway connection step S105 is then ended, fluid pressure is supplied to the actuators 440 of the ratchet mechanisms 432. The locking claws 433 become disengaged from the lock grooves 431 against the resilient force of the spring members, as shown in FIG. 19B. The positions of the pushing parts 420 cease to be secured by the securing parts 430. When the pushing parts 420 are raised, the pushing blocks 422 rotate from the positions of being able to come into contact with the upper surface of the stack 100S to positions of not interfering with the stack 100S. The pushing parts 420 are further raised to the standby positions, and the completed battery pack 100 is conveyed away from the stacking jig 400.

After the battery pack 100 has been taken out, the pushing parts 420 are seated on top of the base plate 410, and the stacking jig 400, which is one set, is routed to the machining stage for the machining process. The number of routing lanes can be reduced in comparison with cases of routing the pushing parts 420 and the base plate 410 separately. The combination of the base plate 410 and the pushing parts 420 in the stacking jig 400 does not change, and the precision with which the height of the stack 100S along the stacking direction Z is maintained within a constant range therefore does not change with each assembly.

The actions and effects of the fourth embodiment described above will be described.

In the pressurization step of this method for producing the battery pack 100, the stack 100S of stacked unit cells 110 is pushed by the pushing parts 420 which are able to move in the stacking direction Z, the positions of the pushing parts 420 in the stacking direction Z are secured in pre-established positions, and the pressurization in the stacking direction Z is then released.

According to this method for producing the battery pack 100, even when the pressurization in the stacking direction Z by the press 405 is released, the stack 100S is pushed by the pushing parts 420 and the elastic adhesives 117 are pushed outward to the regulated thickness. At the same time, any lifting of the stack 100S by the reactive force of the elastic adhesives 117 can be minimized, and the height of the stack 100S along the stacking direction Z can be maintained within a constant range. This production method can be suitably applied to cases in which the machining process performed on the stack 100S and the subsequent welding process, etc., are performed in separate machining stages.

In the fourth embodiment, an aspect was described in which engaging grooves formed in the outer peripheral surfaces of the stopper pins 411 are used, and as the pushing parts 420 ae raised, the pushing parts 420 rotatably move between positions of not interfering with the stack 100S and positions of being able to come into contact with the upper surface of the stack 100S. This aspect is not provided by way of limitation. A motor, a cylinder, etc., may be used to move the pushing parts 420 to positions of not interfering with the stack 100S and positions of being able to come into contact with the upper surface of the stack 100S.

The securing parts 430 are preferably able to secure the positions of the pushing parts 420 in the stacking direction Z at the pre-established positions, and the configuration including the lock grooves 431 and the ratchet mechanisms 432 is not provided by way of limitation. For example, the securing parts 430 can be configured from air clampers.

A variety of alterations can be made to the present invention based on the configuration described in the claims, and such variations are included within the scope of the present invention.

The configuration in which the elastic adhesives 117 are coated in equal thickness along the horizontal direction of the unit cells 110 (the long-axis direction X and the short-axis direction Y) is not provided by way of limitation.

Figure 16:
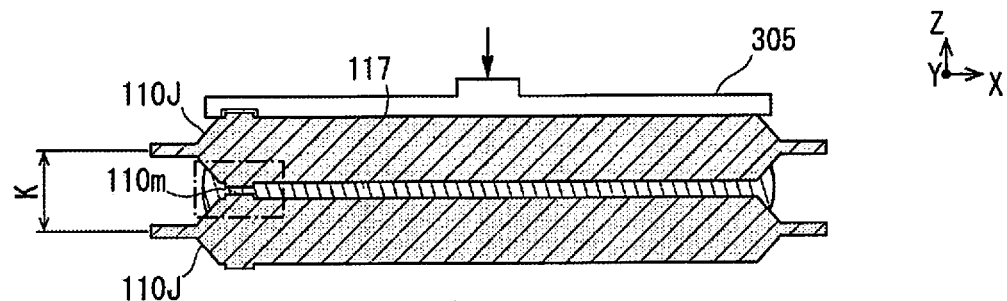
FIG. 16 is a side view in which a first modification (an example in which the amount of the elastic adhesive is adjusted in correspondence to a local thickness of a unit cell) of the method for producing a battery pack of the first to third embodiments is schematically shown in cross-section.

As the first modification of the method for producing the battery pack 100 of the first through third embodiments, for example, the horizontal (along the long-axis direction X and the short-axis direction Y) filling amount V of an elastic adhesive 117 may be adjusted as appropriate in correspondence to a difference in local thickness between unit cells 110J, as shown in a rectangular area (displayed in dotted lines) in FIG. 16. An example in which thicknesses of unit cells 110J differ locally is a protruding part 110m formed from an outward bulge in a laminate film, due to, for example, insulating tape (not shown) being provided to prevent short-circuiting between electrodes inside the unit cells 110J. Thus, even in cases such as when the unit cells 110J locally bulge, as in the protruding parts 110m, in portions having insulating tape, the horizontal (along the long-axis direction X and the short-axis direction Y) filling amount V of the elastic adhesive 117 can be adjusted as appropriate and equal surface pressure can be exerted on the entire surface of the power generation element 111.

A letter "N" shape such as is shown in FIGS. 8D and 9A to 9C is not provided by way of limitation as to the shape of the elastic adhesives 117 coated over the unit cells 110.

Figure 17A:
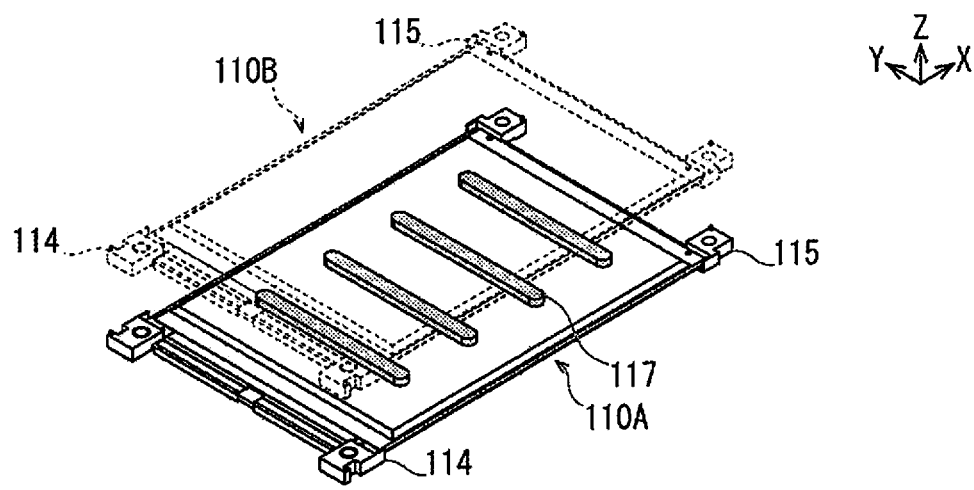
FIG. 17A is a perspective view schematically showing a state in which another unit cell (shown by dashed lines) is brought near to a first unit cell (shown by solid lines) coated with an elastic adhesive, in a second modification (another example of the shape of the elastic adhesive coated over unit cells) of the method for producing a battery pack of the first to third embodiments.
Figure 17B:
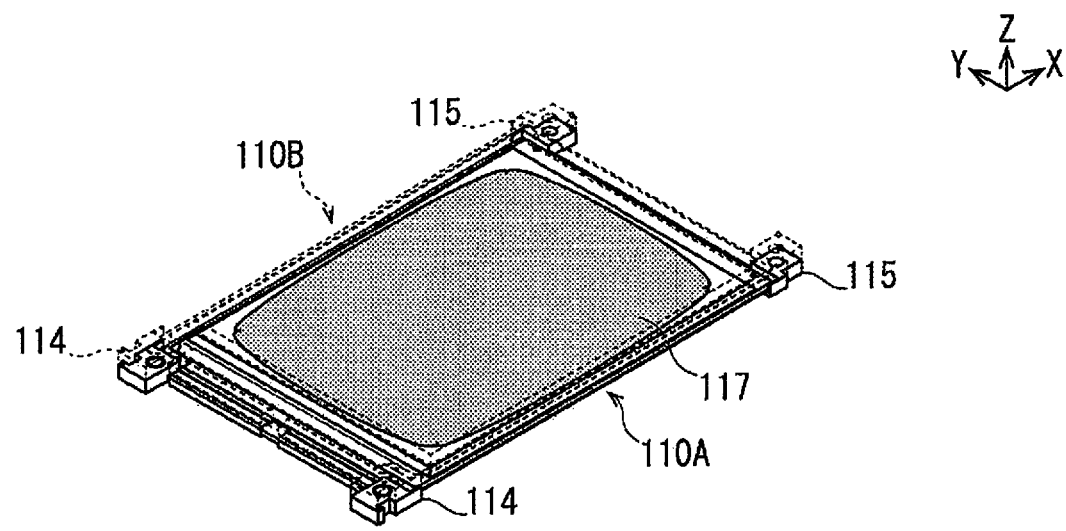
FIG. 17B is a perspective view schematically showing a state in which the other unit cell is brought near to the first unit cell, and while the elastic adhesive is pushed further outward by the weight of the other unit cell, etc., lower surfaces of a pair of spacers attached to the other unit cell come into contact with upper surfaces of a pair of spacers attached to the first unit cell.

As the second modification of the method for producing the battery pack 100 of the first through third embodiments, for example, the elastic adhesive 117 can be rectilinear along the short-axis direction Y of the unit cells 110, and a plurality (e.g., four) of adhesive segments can be coated at constant spacing along the long-axis direction X of the unit cells 110, as shown in FIG. 17A. A naturally falling other unit cell 110B (shown by dashed lines) draws near to a first unit cell 110A (shown by solid lines), as shown in FIG. 17B. Ultimately, lower surfaces of a pair of spacers (the first spacers 114 and the second spacers 115) attached to the other unit cell 110B come into contact with upper surfaces of a pair of spacers (the first spacers 114 and the second spacers 115) attached to the first unit cell 110A and stop. In the state shown in FIG. 17B, the elastic adhesive 117 spreads horizontally outward (in the long-axis direction X and the short-axis direction Y) so as to fill in a gap between a region of a large part of the upper surface of the first unit cell 110A and a region of a large part of the lower surface of the other unit cell 110B.

The thickness of the elastic adhesives 117 can be controlled for each predetermined number of stacked unit cells 110. Additionally, the elastic adhesives 117 can be arranged between unit cells 110 adjacent after stacking for each predetermined number of constant unit cells 110.

In other words, in cases in which variation in the thicknesses of the plurality of unit cells 110 is sufficiently small, cases in which cumulative error in the thickness when the plurality of unit cells 110 are stacked is sufficiently small, etc., the thicknesses of the elastic adhesives 117 may be controlled with each stacking of a constant number of unit cells 110.

The elastic adhesives 117 are not provided by way of limitation as to the filling members. In other words, after a filling member has been filled in between two of the unit cells 110 adjacent along the stacking direction Z, the filling member is preferably sufficiently retained in the gap therein and the filling member preferably has a constant amount of elastic force. If the filling member has sufficient friction force, the filling member does not need adhesive force.

In this method for producing the battery pack 100, the configuration in which the electrode tabs 112 of the unit cells 110 and the busbars 132 are joined by laser welding is not provided by way of limitation. The electrode tabs 112 of the unit cells 110 and the busbars 132 may be joined by being fastened by bolts.

Cells in which power generation elements 111 are covered by laminate films 113 are not provided by way of limitation as to the unit cells 110. The unit cells 110 may be configured from case-type cells having a long rectangular parallelepiped shape.

The configuration in which unit cells 110 are electrically connected to each other via busbars 132 is not provided by way of limitation. The unit cells 110 may be configured such that the electrode tabs 112 of each of the unit cells 110 are directly electrically connected.

The invention claimed is:

1. A battery pack production method for producing a battery pack in which a plurality of unit cells are stacked with a filling member interposed therebetween to form a stack of the unit cells that are electrically connected, the battery pack production method comprising:
    a measuring step of measuring thicknesses of the unit cells;
    an arrangement step of arranging the filling member having a viscosity between adjacent ones of the unit cells in a stacking direction; and
    a pressurization step of pressurizing the filling member arranged between the unit cells in a viscous state in the stacking direction of the unit cells to reduce a thickness of the filling member in the stacking direction, wherein the thickness of the filling member is controlled based on a measured thickness of each of the unit cells in the stacking direction after stacking according to at least one of:
        an amount of the filling member arranged in the arrangement step;
        a length of time during which the filling member is pressurized in the pressurization step; and
        a force pressurizing the filling member in the pressurization step; and
    a distance between stacking-direction centers of two adjacent ones of the unit cells in the stacking direction is kept within a constant range.

2. The battery pack production method according to claim 1, wherein
    the unit cells have terminals to input and output electric power, and busbars electrically connecting the terminals together; and the method further comprising
    connecting the terminals and the busbars after the unit cells are stacked.

3. The battery pack production method according to claim 1, the method further comprising
    keeping the amount of the filling member constant, and controlling the length of time of the pressurizing of the filling member arranged between the adjacent unit cells.

4. The battery pack production method according to claim 1, the method further comprising
    keeping the amount of the filling member constant, and controlling a magnitude of force of the pressurizing of the filling member arranged between the adjacent unit cells.

5. The battery pack production method according to claim 1, the method further comprising
    keeping a magnitude of force of the pressurizing of the filling member constant, and controlling the amount of the filling member arranged between the adjacent unit cells.

6. The battery pack production method according to claim 1, wherein
    the pressurization step includes pushing the stack of the unit cells with a press that is able to move in the stacking direction, securing a stacking-direction position of the press in the stacking direction at a pre-established position, and then releasing the pressurization in the stacking direction.

7. The battery pack production method according to claim 1, wherein
the thickness of the filling member is controlled for each predetermined number of the unit cells stacked.

8. The battery pack production method according to claim 1, wherein
the filling member is arranged between the adjacent unit cells after stacking each for predetermined number of the unit cells stacked.

9. The battery pack production method according to claim 1, wherein
the filling member is disposed between the adjacent unit cells in an area overlapping in the stacking direction with a power generation element provided in each of the unit cells.

10. The battery pack production method according to claim 1, wherein
the filling member includes an elastic adhesive having elastic force after curing.

11. The battery pack production method according to claim 1, wherein
the unit cells are provided with covering members that insulate and cover power generation elements.

* * * * *